US012615606B2

(12) United States Patent
Thangarasa et al.

(10) Patent No.: US 12,615,606 B2
(45) Date of Patent: Apr. 28, 2026

(54) TIME DIFFERENCE OF ARRIVAL AND SIGNAL STRENGTH BASED TIMING ADVANCE VALIDATION FOR CONFIGURED GRANT SMALL DATA TRANSMISSION

(71) Applicant: TELEFONAKTIEBOLAGET LM ERICSSON (PUBL), Stockholm (SE)

(72) Inventors: Santhan Thangarasa, Vällingby (SE); Muhammad Kazmi, Sundbyberg (SE); Zhipeng Lin, Nanjing (CN); Kazuyoshi Uesaka, Kawasaki (JP)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 295 days.

(21) Appl. No.: 18/282,959

(22) PCT Filed: Mar. 19, 2022

(86) PCT No.: PCT/IB2022/052510
§ 371 (c)(1),
(2) Date: Sep. 19, 2023

(87) PCT Pub. No.: WO2022/195564
PCT Pub. Date: Sep. 22, 2022

(65) Prior Publication Data
US 2024/0172155 A1     May 23, 2024

(30) Foreign Application Priority Data

Mar. 19, 2021    (WO) ................ PCT/CN2021/081831

(51) Int. Cl.
*H04W 56/00*          (2009.01)
(52) U.S. Cl.
CPC .............................. *H04W 56/0045* (2013.01)

(58) Field of Classification Search
CPC ..... H04L 1/1642; H04L 47/34; H04L 1/1607; H04W 28/06; H04W 28/082;
(Continued)

(56) References Cited

U.S. PATENT DOCUMENTS

| | | | |
|---|---|---|---|
| 12,402,118 B2 * | 8/2025 | Höglund | H04W 72/115 |
| 2004/0215532 A1 * | 10/2004 | Boman | G07C 9/00 |
| | | | 705/28 |

(Continued)

FOREIGN PATENT DOCUMENTS

| | | | | |
|---|---|---|---|---|
| EP | 3925270 B1 * | 4/2025 | .......... | H04W 56/001 |
| NO | 2020032629 A1 | 2/2020 | | |

(Continued)

OTHER PUBLICATIONS

3GPP, "Ls on uplink timing alignment for small data transmissions", 3GPP TSG-RAN WG2 Meeting #113e R2-2102090, Jan. 25-Feb. 5, 2021, eMeeting.

(Continued)

*Primary Examiner* — Nathan S Taylor
(74) *Attorney, Agent, or Firm* — Sonoda & Kobayashi Intellectual Property Law; Sarvajit S. Patil

(57) ABSTRACT

The present disclosure relates to time difference of arrival and signal strength-based timing advance (TA) validation for configured grant small data transmission. A method performed by a wireless device for validating a TA comprises performing a first measurement of a time of arrival for a first beam, the first measurement being within a first duration of time; performing a second measurement of a time of arrival for a second beam, the second measurement being within a second duration of time; calculating a time difference of arrival (TDOA) magnitude of difference between the first measurement of the time of arrival for the first beam and the second measurement of the time of arrival (Continued)

for the second beam; comparing the TDOA magnitude of difference with a time-difference threshold; and determining whether the TA is valid based on a result of the comparing the TDOA magnitude of difference with the time-difference threshold.

20 Claims, 13 Drawing Sheets

(58) Field of Classification Search
CPC ........... H04W 28/0865; H04W 28/09; H04W 76/15; H04W 88/06; H04W 56/0045; H04W 56/00; H01L 21/6875; H01L 21/687; H01L 21/027; H01L 21/304; H01L 21/67; H01L 21/683; G03F 7/707; G03F 7/70975; G03F 7/7095; G03F 7/00; G03F 7/20
USPC ............................................. 455/42; 370/329
See application file for complete search history.

(56) References Cited

U.S. PATENT DOCUMENTS

| | | | |
|---|---|---|---|
| 2008/0026773 A1* | 1/2008 | Hyun | H04W 64/00 |
| | | | 455/456.1 |
| 2015/0181481 A1* | 6/2015 | Masini | H04W 36/322 |
| | | | 455/436 |
| 2016/0234708 A1* | 8/2016 | Yang | H04W 48/16 |
| 2018/0315262 A1* | 11/2018 | Love | G07C 9/00309 |
| 2019/0174337 A1* | 6/2019 | Prasad | H04B 7/0639 |
| 2019/0281370 A1* | 9/2019 | Struhsaker | H04W 4/80 |
| 2020/0107283 A1* | 4/2020 | Ratasuk | H04L 27/2646 |
| 2020/0275479 A1* | 8/2020 | Peisa | H04W 74/04 |
| 2021/0051673 A1* | 2/2021 | Chae | H04W 72/23 |
| 2021/0203449 A1* | 7/2021 | Chatterjee | H04L 1/1896 |
| 2021/0274526 A1* | 9/2021 | Shin | H04W 76/27 |
| 2022/0007391 A1* | 1/2022 | Höglund | H04W 72/1268 |
| 2022/0038997 A1* | 2/2022 | Höglund | H04W 48/10 |
| 2022/0046490 A1* | 2/2022 | Tripathi | H04W 36/0085 |
| 2022/0078739 A1* | 3/2022 | Zhang | H04W 56/0045 |
| 2022/0094508 A1* | 3/2022 | Keating | H04B 7/063 |
| 2022/0124658 A1* | 4/2022 | Beale | H04W 24/10 |
| 2022/0124659 A1* | 4/2022 | Liberg | H04W 56/0045 |
| 2022/0124780 A1* | 4/2022 | Lei | H04L 5/0053 |
| 2022/0167425 A1* | 5/2022 | Lei | H04L 27/2602 |
| 2022/0225257 A1* | 7/2022 | Laselva | H04W 56/0095 |
| 2022/0232504 A1* | 7/2022 | Cozzo | H04W 56/0045 |
| 2022/0272649 A1* | 8/2022 | Wiacek | H04B 7/185 |
| 2023/0090914 A1* | 3/2023 | Cha | H04W 24/10 |
| | | | 370/329 |
| 2023/0113784 A1* | 4/2023 | Cha | H04W 72/1268 |
| | | | 370/329 |
| 2023/0142084 A1* | 5/2023 | Cha | H04W 56/00 |
| | | | 455/456.1 |
| 2023/0189181 A1* | 6/2023 | Liberg | H04W 56/0015 |
| | | | 370/350 |
| 2023/0275636 A1* | 8/2023 | Singh | H04B 7/063 |
| | | | 375/299 |
| 2023/0379860 A1* | 11/2023 | Rao | H04W 64/00 |
| 2024/0259150 A1* | 8/2024 | Cha | H04W 74/0833 |
| 2025/0227714 A1* | 7/2025 | Lei | H04L 1/1607 |

FOREIGN PATENT DOCUMENTS

| | | | |
|---|---|---|---|
| WO | 2020065619 A1 | 4/2020 | |
| WO | 2020157734 A1 | 8/2020 | |
| WO | 2020188144 A1 | 9/2020 | |
| WO | 2020225161 A1 | 11/2020 | |
| WO | WO-2021086244 A1 * | 5/2021 | ........ H04W 56/0045 |

OTHER PUBLICATIONS

ZTE Corporation, Work Item on NR smalldata transmissions in Inactive state, 3GPP TSG RAN Meeting #88e RP-201305, Jun. 29-Jul. 3, 2020, eMeeting.

* cited by examiner

BEGIN

1110
Host computer
provides user
data

1120
Host computer
initiates
transmission
carrying the
user data to the
UE

1130
UE receives the
user data

END

TIME DIFFERENCE OF ARRIVAL AND SIGNAL STRENGTH BASED TIMING ADVANCE VALIDATION FOR CONFIGURED GRANT SMALL DATA TRANSMISSION

RELATED APPLICATIONS

This application is a national stage application of International Patent Application No. PCT/IB2022/052510, filed Mar. 19, 2022, which claims priority to International Patent Application No. PCT/CN2021/081831, filed Mar. 19, 2021, the disclosure disclosures of which are hereby incorporated in their entirety by reference.

TECHNICAL FIELD

Embodiments of the present disclosure relate to methods and apparatus of timing advance validation and in particular timing advance validation for small data transmission.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

"RP-201305 Work Item on NR small data transmissions in INACTIVE state" by the 3rd Generation Partnership Project (3GPP), available at https://www.3gpp.org/ftp/TSG_RAN/TSG_RAN/TSGR_88 e/Docs/RP-201305.zip as of 23 Feb. 2022.

"RS-2102090 LS on uplink timing alignment for small data transmissions" by the 3rd Generation Partnership Project (3GPP), available at http://www.3gpp.org/ftp/tsg_ran/WG2_RL2//TSGR2_113-e/Docs/R2-2102090.zip as of 23 Feb. 2022.

SUMMARY

It is an object of the present disclosure to provide methods of timing advance validation for small data transmission.

An aspect of the disclosure provides a method performed by a wireless device for validating a timing advance. The method comprising performing a first measurement of a time of arrival for a first beam, the first measurement being within a first duration of time. The method further comprises performing a second measurement of a time of arrival for a second beam, the second measurement being within a second duration of time. The method further comprises calculating a time difference of arrival (TDOA) magnitude of difference between the first measurement of the time of arrival for the first beam and the second measurement of the time of arrival for the second beam; comparing the TDOA magnitude of difference with a time-difference threshold. The method further comprises determining whether the timing advance is valid based on a result of the comparing the TDOA magnitude of difference with the time-difference threshold.

Another aspect of the disclosure provides a method performed by a base station for validating a timing advance. The method comprising determining a time-difference threshold for a wireless device. The method further comprises transmitting the time-difference threshold to the wireless device. To determine whether the timing advance is valid, the time-difference threshold is compared with a time difference of arrival (TDOA) magnitude of difference between a first measurement of a time of arrival for a first beam and a second measurement of a time of arrival for a second beam.

Another aspect of the disclosure provides a wireless device for validating a timing advance. The wireless device comprises processing circuitry configured to perform a first measurement of a time of arrival for a first beam, the first measurement being within a first duration of time. The processing circuitry is further configured to perform a second measurement of a time of arrival for a second beam, the second measurement being within a second duration of time. The processing circuitry is further configured to calculate a time difference of arrival (TDOA) magnitude of difference between the first measurement of the time of arrival for the first beam and the second measurement of the time of arrival for the second beam. The processing circuitry is further configured to compare the TDOA magnitude of difference with a time-difference threshold. The processing circuitry is further configured to determine whether the timing advance is valid based on a result of the comparing the TDOA magnitude of difference with the time-difference threshold. The wireless device further comprises power supply circuitry configured to supply power to the wireless device.

Another aspect of the disclosure provides a base station for validating a timing advance. The base station comprising processing circuitry configured to determining a time-difference threshold for a wireless device. The processing circuitry is further configured to transmit the time-difference threshold to the wireless device. To determine whether the timing advance is valid, the time-difference threshold is compared with a time difference of arrival (TDOA) magnitude of difference between a first measurement of a time of arrival for a first beam and a second measurement of a time of arrival for a second beam. The base station further comprises power supply circuitry configured to supply power to the wireless device.

Another aspect of the disclosure provides a communication system including a host computer comprising processing circuitry configured to provide user data. The host computer further comprises a communication interface configured to forward the user data to a cellular network for transmission to a user equipment (UE). The cellular network comprises a base station having a radio interface and processing circuitry. The base station's processing circuitry is configured to determine a time-difference threshold for a wireless device. The base station's processing circuitry is further configured to transmit the time-difference threshold to the wireless device. To determine whether the timing advance is valid, the time-difference threshold is compared with a time difference of arrival (TDOA) magnitude of difference between a first measurement of a time of arrival for a first beam and a second measurement of a time of arrival for a second beam.

Another aspect of the disclosure provides a communication system including a host computer comprising processing circuitry configured to provide user data. The host computer further comprises a communication interface configured to forward user data to a cellular network for transmission to a user equipment (UE). The UE comprises a radio interface and processing circuitry. The UE's components configured to perform a first measurement of a time of arrival for a first beam, the first measurement being within a first duration of time. The UE's components are configured to perform a second measurement of a time of arrival for a second beam, the second measurement being within a second duration of time. The UE's components are configured to calculate a time difference of arrival (TDOA) magnitude of difference between the first measurement of the time of arrival for the first beam and the second measurement of the time of arrival for the second beam. The UE's components are configured to compare the TDOA magnitude of difference with a time-difference threshold. The UE's components are configured to determine whether the timing advance is valid based on a result of the comparing the TDOA magnitude of difference with the time-difference threshold.

BRIEF DESCRIPTION OF DRAWINGS

For a better understanding of the present disclosure, and to show how it may be put into effect, reference will now be made, by way of example only, to the accompanying drawings, in which.

DETAILED DESCRIPTION

Small Data Transmission

Figure 1:
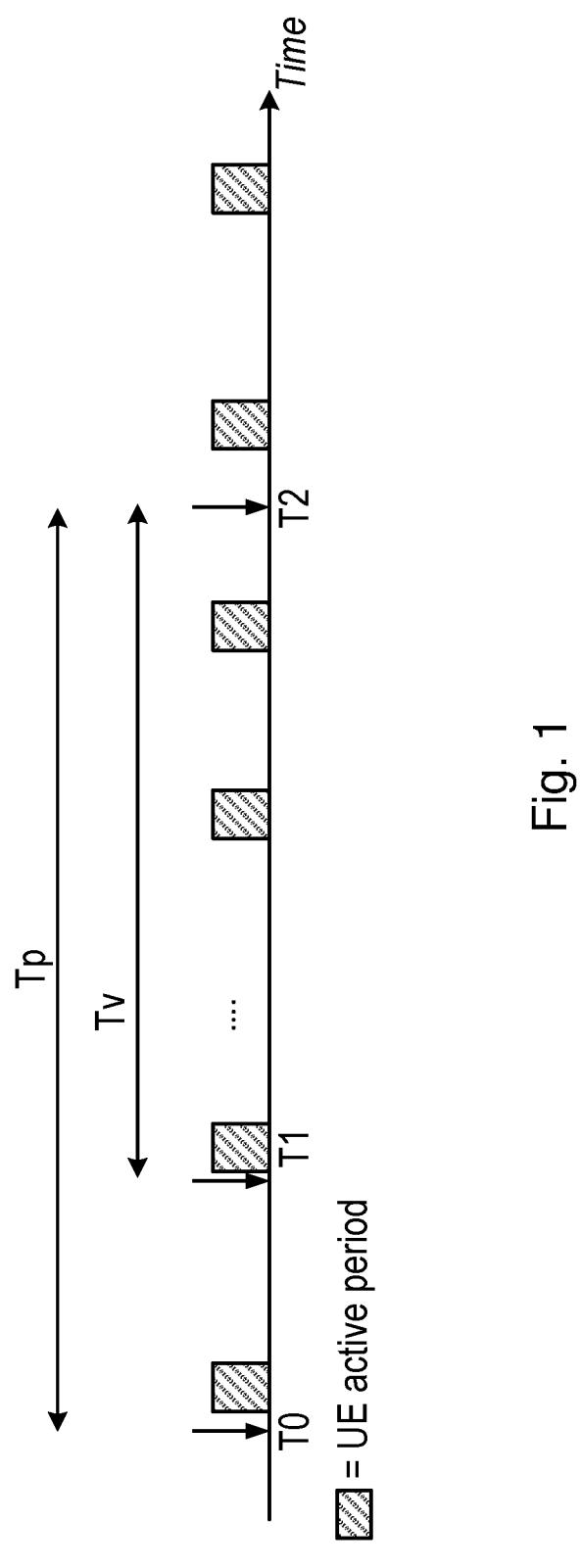
FIG. 1 depicts an example associated with time-difference-of-arrival (TDOA) and measurement-based timing advance (TA) validation for configured grant-based small data (CG-SDT) transmission.

NR supports RRC_INACTIVE state and UEs with infrequent (periodic and/or non-periodic) data transmissions are generally maintained by the network in the RRC_INACTIVE state. Until Rel-16, the RRC_INACTIVE state did not support data transmission. Hence, the UE had to resume the connection (e.g., move to RRC_CONNECTED state) to communicate any DL and UL data. Connection setup and subsequent release to INACTIVE state may happen for each data transmission. This results in unnecessary power consumption and signaling overhead. For this reason, support for transmission using preconfigured uplink resources (also referred as PUR) is being introduced. The UE is allocated with PUR resources during RRC connected state and is also assigned a timing advance (TA) value by the serving cell. It is expected that the PUR resources can be of different types, namely dedicated, contention-free shared or contention-based shared PUR resources. A PUR resource may be a physical channel resource such as a physical channel, e.g., PUSCH resource such as resource blocks for PUSCH. In some aspects, a PUR resource may be allocated in both time and frequency domain. The UE uses the preconfigured TA value when transmitting using the PUR resources in idle state provided that the serving cell of the UE remains the same. If the serving cell changes, then the PUR resources and TA value from the previous serving cell become invalid.

In addition, the UE can also be configured to check the validity of the TA value based on one or more other criteria which are, for example, related to changes in the RRM measurements (e.g., signal strength measurements).

NR Solutions for Supporting Small Data Transmission

In NR Rel-17 SDT work item, two main solutions will be specified for enabling SDT in RRC_INACTIVE state: RACH-based SDT (e.g., transmitting small data on Message A PUSCH in a 2-step RACH procedure, or transmitting small data on Message 3 PUSCH in a 4-step RACH procedure) and Configured Grant (CG) based SDT (e.g., SDT over configured grant type-1 PUSCH resources for UEs in RRC inactive state).

The 2-step, 4-step RACH and configured grant type have already been specified as part of Rel-15 and Rel-16. So, the SDT features to be specified in NR Rel-17 build on these building blocks to enable small data transmission in INACTIVE state for NR.

The present disclosure contemplates a CG-based SDT scheme. The following agreements were made in RAN2 for CG-based SDT scheme [2]:

1. CG-SDT resource configuration is provided to UEs in RRC_Connected within the RRCRelease message, and, as such, no need to also include it in RRCReconfiguration message.

2. CG-PUSCH resources can be separately configured for normal uplink (NUL) and supplemental uplink (SUL). It is for further study (FFS) whether we allow them at the same time. This depends on the alignments CRs for Rel-16.

3. For CG-SDT, the subsequent data transmission can use the CG resource or a DG (e.g., dynamic grant addressed to UE's C-RNTI). The C-RNTI can be the same as the previous C-RNTI or may be configured explicitly by the network.

4. Timing advance timer for small data transmissions (TAT-SDT) is started upon receiving the TAT-SDT configuration from gNB, e.g., RRCrelease message, and can be (re)started upon reception of TA command 5. From RAN2 point of view, assume similar to PUR, that we introduce a TA validation mechanism for SDT based on reference symbol/signal received power (RSRP) change, e.g., RSRP-based threshold(s) are configured to confirm. FFS on how to handle CG configuration when TA expires or when TA is invalid due to RSRP threshold. Details of the TA validation procedure can be further discussed.

any of the activated SCells of this TAG as a timing reference cell, but should not change it unless necessary.

Timing advance updates are signaled by the gNB to the UE via MAC CE commands Such commands restart a TAG-specific timer which indicates whether the L1 can be synchronized or not: when the timer is running, the L1 is considered synchronized, otherwise, the L1 is considered non-synchronized (in which case uplink transmission can take place on PRACH).

The TA timer is configured in TAG-Config IE in the IE MAC-CellGroupConfig which is used to configure MAC parameters for a cell group, including DRX.

```
-- ASN1START
-- TAG-TAG-CONFIG-START
TAG-Config ::=              SEQUENCE {
    tag-ToReleaseList          SEQUENCE (SIZE (1..maxNrofTAGs)) OF TAG-Id
OPTIONAL,    -- Need N
    tag-ToAddModList           SEQUENCE (SIZE (1..maxNrofTAGs)) OF TAG
OPTIONAL    -- Need N
}
TAG ::=                                SEQUENCE {
    tag-Id                             TAG-Id,
    timeAlignmentTimer                 TimeAlignmentTimer,
    ...
}
TimeAlignmentTimer ::=        ENUMERATED {ms500, ms750, ms1280, ms1920,
ms2560, ms5120, ms10240, infinity}
-- TAG-TAG-CONFIG-STOP
-- ASN1STOP
```

TAG field descriptions
tag-Id
Indicates the TAG of the SpCell or an SCell. Uniquely identifies the TAG within the scope of a Cell Group (i.e. MCG or SCG).
timeAlignmentTimer
Value in ms of the timeAlignmentTimer for TAG with ID tag-Id.

6. UE releases CG-SDT resources when TAT expires in RRC_Inactive state.

NR CG-Based PUSCH Transmission

CG PUSCH resources are the PUSCH resources configured in advance (e.g., preconfigured) for the UE. When there is uplink data available at a buffer of the UE, it can immediately start uplink transmission using the pre-configured PUSCH resources without waiting for an UL grant from the gNB, thus reducing the latency. NR supports CG type 1 PUSCH transmission and CG type 2 PUSCH transmission. For both these types, the PUSCH resources (time and frequency allocation, periodicity, etc.) are preconfigured via dedicated RRC signaling. The CG type 1 PUSCH transmission is activated/deactivated by RRC signaling, while the CG type 2 PUSCH transmission is activated/deactivated by an UL grant using downlink control information (DCI) signaling.

Time Alignment in NR

In RRC_CONNECTED state, the gNB is responsible for maintaining the timing advance to keep the L1 synchronized. Serving cells having UL to which the same timing advance applies and using the same timing reference cell are grouped in a TAG. Each TAG contains at least one serving cell with configured uplink, and the mapping of each serving cell to a TAG is configured by RRC.

For the primary TAG the UE uses the PCell as timing reference, except with shared spectrum channel access where an SCell can also be used in certain cases (see clause 7.1, TS 38.133 [13]). In a secondary TAG, the UE may use There currently exist certain challenge(s). Transmission in INACTIVE mode using preconfigured uplink resources (PUR) is realized by UE obtaining timing advance (TA) command in the RRC_CONNECTED state and later using that TA in INACTIVE state for adjusting the UE timing for the uplink transmission. However, the uplink transmission using PUR in INACTIVE state may not take place immediately or within short time after the reception of the PUR configuration including TA command Typically, it occurs later in time. Prior to transmission, the UE is required to validate the received TA which is done using changes in RRM measurements, a first one of which is performed around the time when TA was obtained and the second one is performed around the time when the validation is performed.

The problem with this legacy way of validating TA using changes in RRM measurements is that UE can be camped on or operating using different beams, and the measurements of each beam can vary considerably. Hence, the outcome of a TA validation using changes in RRM measurement can be misleading unless it is done carefully taking into consideration the beam aspects, which may be onerous for the UE and may consume UE resources such as processing power, memory usage, power consumption, or the like.

Certain aspects of the present disclosure and their embodiments may provide solutions to these or other challenges.

The present disclosure contemplates a plurality of embodiments for the wireless device (e.g., UE), as described below.

According to a first embodiment, the TA validation is based on the received timing difference of the serving beam(s) (e.g., difference in times of arrival of one or more serving beams). This may also be referred to as TDOA-based TA validation. A first time of arrival may be measured at a certain time instance (which is within (T1±Δt11)) and a second time of arrival may be measured at another time instance (which is within (T2−Δt21)) respectively. T1 is the time when latest TA value was obtained from the network node (e.g., serving network node), when TA value was updated, or when SDT configuration containing TA value was obtained. T2 is the time when data arrives for transmission at the UE and TA validation is performed. An example of the serving beam is the beam whose received timings are estimated for TA validation e.g., beam within configured set of beams associated with CG configuration. In one example the serving beam can be the beam with strongest signal strength (e.g., beam with largest RSRP among configured beams), and the serving beams are denoted as $B_0$ and $B_1$ at time T1 and T2 respectively. In another example the serving beam can be the beam with signal strength above certain threshold, which can be pre-defined or configured.

The TA validity is determined by the UE based on a relation or function between received timings of the beam at the UE ($T_{T1,\,B0}$ and $T_{T2,\,B1}$) with respect to a threshold (H1) (e.g., time-difference threshold).

In one example of the relation the TA is evaluated to be valid when following condition is met; otherwise, the TA is considered to be invalid.

$$IT_{T1,B0}-T_{T2,B1}|\leq H1 \qquad (1)$$

where, $T_{T1,\,B0}$ is the received beam timing (e.g., time of arrival for beam $B_0$) in the serving beam, $B_0$, where $T_{T1,\,B0}$ is determined at certain time instance which is within T1±Δt11. As an example, Δt11=0, $T_{T2,\,B1}$ is the received beam timing (e.g., time of arrival for beam $B_1$) in the serving beam, $B_1$, where $T_{T2,\,B0}$ is determined at certain time instance which is within T2−Δt21. As an example, Δt21=0, H1 is a configurable or predefined time duration threshold indicating a maximum allowed received beam timing change between T1 an T2. In some aspects, H1 may be a fraction of a time duration associated with the Cyclic Prefix (e.g., H1=Cyclic Prefix (also called CP)/N, where N=1, 2, 3 . . . ).

According to a second embodiment, the UE determines a relation between the serving beams $B_0$ and $B_1$ determined by the UE at times associated with T1 and T2, and selects a TA validation method for validating the TA before SDT transmission based on the determined relation. The description of T1 and T2 in previous embodiment applies also here. Examples of relation between $B_0$ and $B_1$ are:

$B_0=B_1$ (e.g., same beam index such as $B_0=B_1=$SSB0) where UE assumes that the serving beam of the UE at T2 is the same as it was at T1 then the UE assumes that no beam change has been occurred.

$B_0 \neq B_1$ (e.g., different beam indices such as $B_0=$SSB0 and B 1=SSB1) where UE assumes that the serving beam of the UE at T2 is different than the serving beam at T1 then the UE assumes that at least one beam has changed.

If the determined relation shows:

When $B_0=B_1$, the UE validates the TA based on the method described with respect to the first embodiment (TDOA-based TA validation).

When $B_0 \neq B_1$, the UE validates the TA based on a method that depends on a signal strength measurement change. This method may also be referred to as signal strength-based TA validation. In some aspects, a magnitude of difference between RSRP measurements of $B_0$ and $B_1$ (e.g., SS magnitude of difference), completed within T1±Δt12 and T2−Δt22 respectively, is compared to a delta threshold (e.g., SS-difference threshold). The RSRP measurement of $B_0$ completed within T1±Δt12 may be referred to as $BM_0$ and the RSRP measurement of $B_1$ completed within T2−Δt22 may be referred to as $BM_1$. When the magnitude of difference is greater than the delta threshold, the UE may determine that the TA is invalid. Alternatively, when the magnitude of difference is less than or equal to the delta threshold, the UE may determine that the TA is valid. In some aspects, an absolute value of RSRP measurement completed within T2−Δt22 is compared to an absolute threshold. When the absolute value of RSRP is greater than or equal to the absolute threshold, the UE may determine that the TA is valid. Alternatively, when the absolute value of RSRP is less than the absolute threshold, the UE may determine that the TA is invalid. As an example, Δt12=0 and Δt22=0.

In some aspects, the UE may follow the TDOA-based TA validation when $B_0 \neq B_1$ and follow the signal strength-based TA validation when $B_0=B_1$. In some aspects, the network may indicate to the UE whether to follow the TDOA-based TA validation or to follow the signal strength-based TA validation on a case-by-case basis. For instance, the network may indicate that the UE is to follow a given TA validation from between the TDOA-based TA validation or signal strength-based TA validation for a given SDT transmission via RRC configuration and may dynamically indicate that the UE is to follow the other TA validation from between the TDOA-based TA validation or the signal strength-based TA validation for a subsequent SDT transmission via DCI or MAC CE.

According to a third embodiment, UE is configured with at least two TA validation methods and a condition or rule for performing the validation (determining whether the TA is valid). The validation methods are as described above, e.g., based on received timing difference of the serving beam(s) at $T_{T1,\,B0}$ and $T_{T2,\,B0}$ as expressed with respect to the first embodiment (e.g., TDOA-based TA validation) and the second condition is based on signal strength measurement change between measurements done or completed by T1±Δt12 and T2−Δt22 (e.g., signal strength-based TA validation). The rule specifies the order for performing validation methods and whether TA needs to be valid using at least one or both validation methods. In one example, the said rule requires the UE to determine that the TA is valid when both the following conditions are satisfied.

$$|T_{T1,B0}-T_{T2,B1}|\leq H1 \qquad (1)$$

$$|BM_0-BM_1|\leq H2 \qquad (2)$$

where, $BM_1$ is a signal strength measurement performed on the beam $B_0$ (e.g., RSRP of SSB0) completed within T1±Δt12, $BM_2$ is a signal strength measurement performed on the beam $B_1$ (e.g., RSRP of SSB1) completed within T2−Δt22.

H2 is configurable or predefined threshold related to measurement accuracy levels associated with BM1 and BM2.

In another example, the said rule may require the UE to determine that the TA is valid when at least one of the above conditions is satisfied. In this example, when the first condition is satisfied, the UE may omit checking as to whether the second condition is satisfied. In some aspects, the UE may be programmed to autonomously check for a given condition first (e.g., according to a specification, according to a random order, etc.) or the network may indicate to the UE as to which condition is to be checked first.

When the UE is configured with multiple beams (e.g., SSBs) and UE is required to validate the TA before transmitting small data transmissions, then the methods contemplated in the present disclosure (based on received time difference between beams at the UE) enable the UE to select a TA validation method that is more reliable, less complex, and more power efficient based on the mobility behavior of the UE.

The various embodiments proposed herein address one or more of the technical issues disclosed herein.

Certain embodiments may provide one or more of the following technical advantage(s). TA validation becomes more reliable and at the same time more UE power efficient as process of validating the TA is adapted to the UE mobility and NW deployment with multiple beams (e.g., FR2). Power consumption is crucial for the UE which are going to apply SDT in practice, examples of such devices can be wearables, sensors etc. By applying TA validation based on received beam timing change, the UE does not have to perform dedicated RSRP measurements of the beams configured for SDT, which makes the process both faster and power efficient.

Some of the embodiments contemplated herein will now be described more fully with reference to the accompanying drawings. Other embodiments, however, are contained within the scope of the subject matter disclosed herein, the disclosed subject matter should not be construed as limited to the embodiments set forth herein; rather, these embodiments are provided by way of example to convey the scope of the subject matter to those skilled in the art.

Terminology

In some embodiments a more general term "network node" is used and it can correspond to any type of radio network node or any network node, which communicates with a UE and/or with another network node. Examples of network nodes are radio network node, gNodeB (gNB), ng-eNB, base station (BS), NR base station, TRP (transmission reception point), multi-standard radio (MSR) radio node such as MSR BS, network controller, radio network controller (RNC), base station controller (BSC), relay, access point (AP), transmission points, transmission nodes, RRU, RRH, nodes in distributed antenna system (DAS), core network node (e.g., MSC, MME, etc), O&M, OSS, SON, positioning node or location server (e.g., E-SMLC), MDT, test equipment (physical node or software), etc.

In some embodiments the non-limiting term user equipment (UE) or wireless device is used and it refers to any type of wireless device communicating with a network node and/or with another UE in a cellular or mobile communication system. Examples of UE are wireless device supporting NR, target device, device to device (D2D) UE, machine type UE or UE capable of machine to machine (M2M)

communication, PDA, PAD, Tablet, mobile terminals, smart phone, laptop embedded equipped (LEE), laptop mounted equipment (LME), drone, USB dongles, ProSe UE, V2V UE, V2X UE, etc.

The term "radio node" may refer to radio network node or UE capable of transmitting radio signals or receiving radio signals or both.

The term radio access technology, or RAT, may refer to any RAT e.g., UTRA, E-UTRA, narrow band internet of things (NB-IoT), WiFi, Bluetooth, next generation RAT, New Radio (NR), 4G, 5G, etc. Any of the equipment denoted by the term node, network node or radio network node may be capable of supporting a single or multiple RATs.

The UE performs measurements on reference signal (RS). Examples of RSs are discover-signal or discovery reference signal (DRS), SSB, CSI-RS, CRS, DMRS, PSS, SSS etc. Examples of measurements are cell identification (e.g., PCI acquisition, cell detection), Reference Symbol Received Power (RSRP), Reference Symbol Received Quality (RSRQ), secondary synchronization RSRP (SS-RSRP), SS-RSRQ, SINR, RS-SINR, SS-SINR, CSI-RSRP, CSI-RSRQ, acquisition of system information (SI), cell global ID (CGI) acquisition, Reference Signal Time Difference (RSTD), UE RX-TX time difference measurement, radio link quality, Radio Link Monitoring (RLM), which consists of Out of Synchronization (out of sync) detection and In Synchronization (in-sync) detection, Layer-1 RSRP (L1-RSRP), Layer-1 SINR (L1-SINR) etc.

The terms small data transmissions (SDT), transmissions using configured grant configured PUSCH resources in RRC inactive and/or RRC idle state, and transmissions using preconfigured uplink resources (PUR) are interchangeably used. In this context, these terms refer to transmissions using preconfigured uplink resources in one or more uplink channels (e.g., PUCCH, PUCCH, PRACH). In some examples, PUR and transmission using CG resources are interchangeably used.

Common Aspects for Embodiments Associated with the UE Validating TA

The CG resources or CG configuration is associated with two or more downlink reference signals. In one example the UE can be configured with the association or relation or link between DL RSs (e.g., SSBs) and the CG resources in the same message containing CG configuration (e.g., RRC connection release) or in different message. In another example the association or relation or link between DL RSs (e.g., SSBs) and the CG resources can be pre-defined or pre-configured in the UE. Examples of DL RS are SSB, CSI-RS etc. Each DL RS is transmitted by the cell in one or more time-frequency resources. For example, one SSB is transmitted over 4 symbols and over 20 RBs etc. Each DL RS (e.g., SSB) may interchangeably be called as a DL beam, spatial filter, spatial domain transmission filter, main lobe of the radiation pattern of antenna array etc. The RS or beams may be addressed or configured by an identifier, which can indicate the location of the beam in time in beam pattern, e.g., beam index such as SSB index indicate SSB beam location in the pre-defined SSB format/pattern. For example, the term beam used herein may refer to RS such as SSB, CSI-RS etc.

An example TA validation scenario in time domain is illustrated in FIG. 1. In FIG. 1, T1 is the time when TA was obtained from the network node (e.g., serving network node gNB/eNB), when TA value was updated, or when SDT configuration containing TA value was obtained. The signal level of the serving beam (also referred to as old beam) at the UE around T1 is denoted by a first measurement (BM$_0$). The corresponding serving beam is denoted by a first beam (B$_0$). More specifically BM$_0$ is completed at time instance Tb1, where Tb1 is related to T1 as follows:

$$(T1-\Delta Tb11) \leq Tb1 \leq (T1+\Delta Tb12)$$

In one example $\Delta Tb11 \neq \Delta Tb12$. In another example $\Delta Tb11 = \Delta Tb12$. As an example, $\Delta Tb11$ may comprise one or multiple DRX cycles or one or more time resources (e.g., K1 slots etc), and $\Delta Tb12$ may also comprise one or multiple DRX cycles or one or more time resources (e.g., k2 slots etc). As an example: $\Delta Tb11=0$ and/or $\Delta Tb12=0$.

The signal level may comprise a signal measurement performed by the UE on one or more reference signals (RS) transmit by the serving cell. Examples of signal measurements are RSRP, RSRQ, SINR, SNR etc. Examples of PS are SSB, CSI-RS, PRS, DMRS etc. The signal measurement may also be referred to as beam signal measurement, or beam measurement, or the like. The UE can determine the serving beam based on a relation between the measured signal level and a beam measurement threshold (Bt). In one example the serving beam is the one whose signal measurement is above (e.g., greater than) Bt. In another example the serving beam is the one whose signal measurement is at least X dB above Bt (expressed also in log scale). In case of multiple beams, the serving beam is the one which has largest signal measurement level among all beams and is also above Bt or X dB above Bt. Parameters X and Bt can be pre-defined and/or configured by the network node.

T2 is the time when the TA validation is performed. The signal level of the serving beam (also referred to as new beam if beam has changed) around time T2 is denoted by a second measurement (BM$_1$). The corresponding serving beam is denoted by a second beam (B$_1$). This is because over the time the serving beam of the UE may change e.g., if another beam's signal level becomes larger than that of the previous serving beam (e.g., old beam) and also above Bt. But if UE has not performed any change in serving beam between time T1 and T2, then B$_0$=B$_1$. Otherwise, B$_0 \neq$B$_1$. Therefore, BM$_0$ and B$_0$ are associated with T1 and BM$_1$ and B$_1$ are associated with T2.

More specifically BM$_1$ is completed at time instance Tb2, where Tb2 is related to T2 as follows:

$$(T2-\Delta Tb2) \leq Tb2 \leq T2$$

As an example, $\Delta Tb2$ may comprise one or multiple DRX cycles or one or more time resources (e.g., k3 slots etc). As an example: $\Delta Tb2=0$. In this case BM$_1$ is completed at T2.

Tv, as shown in FIG. 1, is the time between last TA evaluation/validation or time when last TA was received/updated and the time when current TA validation is performed. This time period depends on, for example, when UE has been paged last time, when UE has switched to the RRC_CONNECTED state last time, PUR periodicity, and/or traffic/data/service type. FIG. 1 also shows the Tp which is the PUR periodicity, e.g., last PUR occasion occurred at time T0 and the new occurrence is at time T2. Similar to Tv, the Tp may depend on several factors including when UE has been paged last time, when UE has switched to the RRC_CONNECTED state last time, PUR periodicity, and/or traffic/data/service type. TA validation is performed by the UE when the UE higher layers trigger the transmission of data using PUR resources (e.g., data arrives at a buffer of the UE for transmission). Therefore prior to transmission UE needs to validate whether the previously received TA is still valid. The UE transmits in UL using PUR resources when the UE determines that the TA is valid. Otherwise, it refrains from transmitting using the preconfigured resources.

In one example, BM$_0$ and BM$_1$ are signal strength measurements such as RSRP. Some metrics for determination of TA validation may be related to the absolute RSRP or the RSRP change. Some methods on how to calculate the RSRP or RSRP change are provided in this section.

The RSRP variation calculation is based on one or more of the following:
The RSRP variation is calculated based on measurement on the same SSB with same SSB index.
The RSRP variation can be calculated based on measurement on different SSBs with different SSB indices, which are selected by UE for SDT.
In an example, the RSRP change can be based on the latest SSB selected and the latest SSB selected some time ago, wherein the "some time" can be a predetermined time such as, for example, the time when RRC released to enter RRC inactive state, when latest TA was obtained or updated, or when SDT configuration was received.

The UE can be configured with one or more TA validation methods. The methods used for validating the TA are configured by the serving network node or preconfigured by the operator or a third node which is different from the serving network node. Alternatively, it can be specified as a rule in specification. Examples of methods that can be used for TA validation are based on:
Serving cell changes
Beam changes
Timer based validation e.g., upon receiving TA value the UE starts a timer and upon its expiry the TA becomes invalid.
Serving cell measurement (e.g., RSRP) changes.
Received beam timing changes (e.g., based on TDOA measurement)

Figure 2:
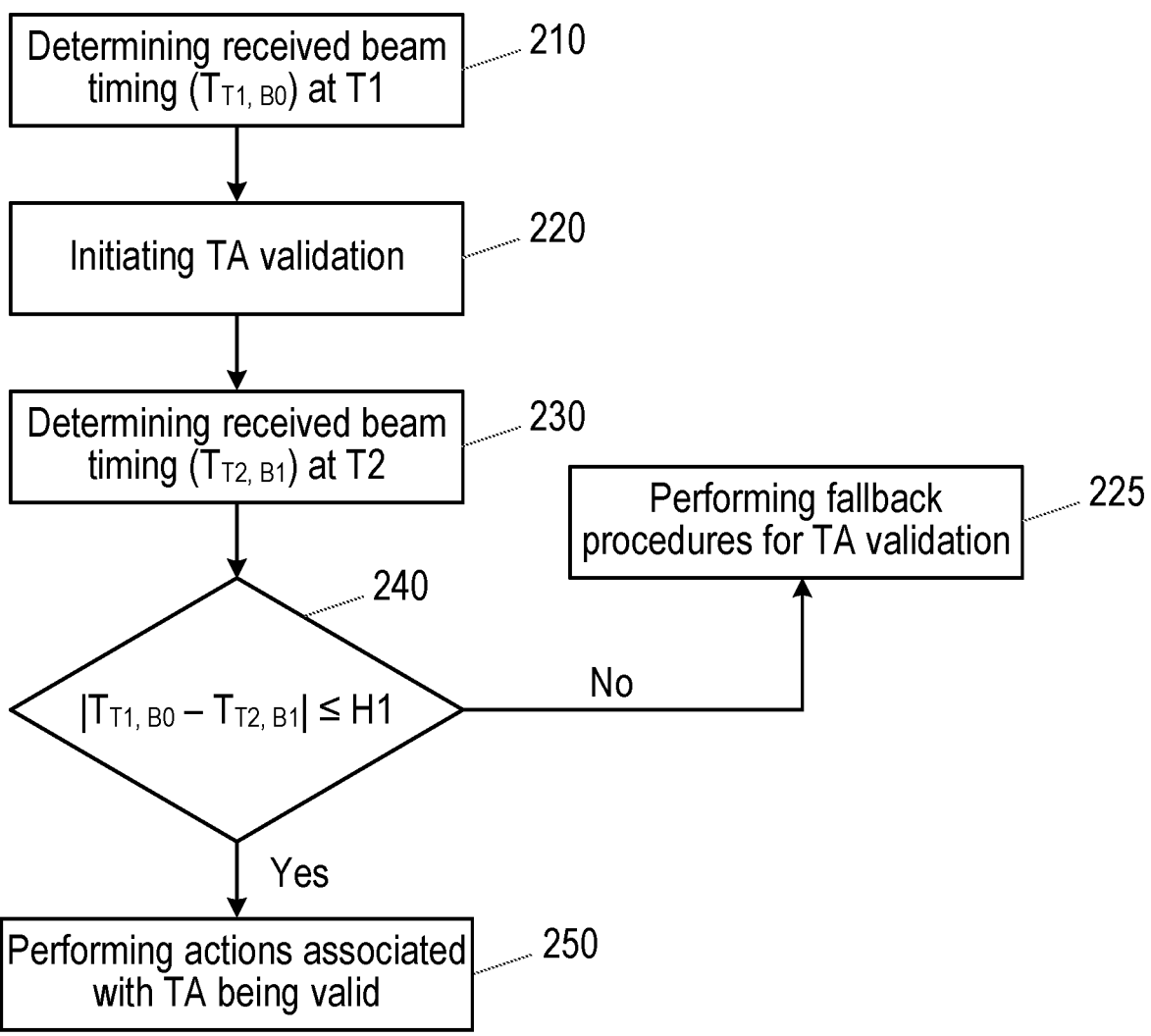
FIG. 2 depicts an example process associated with TDOA and measurement-based TA validation for CG-SDT transmission.

Embodiment 1: A Method in the UE for Validating TA Based on Received Beam Timing Changes is Illustrated in FIG. 2

In (210), the UE is determining the received timing (e.g., a time of arrival) of the current beam (B$_0$), where the received beam timing is denoted as T$_{T1, B0}$ and where T$_{T1, B0}$ is determined/measured within the interval T1±6.01. As an example, $\Delta t11$ may comprise one or multiple DRX cycles or one or more time resources (e.g., K1 slots, etc.). As an example, $\Delta t11=0$ as shown in FIG. 1. The determined received beam timing is then stored in the UE (e.g., memory).

In one example the received timing of a beam at the UE (e.g., T$_{T1, B0}$ for B$_0$) may correspond to the time at which the UE detects the first path of a beam in time. In another example the received timing of a beam at the UE (e.g., T$_{T1, B0}$ for B$_0$) may correspond to the time at which the UE detects the strongest path of the beam (e.g., path whose signal strength is largest among all the paths). In another example the received timing of a beam at the UE (e.g., T$_{T1, B0}$ for B$_0$) may correspond to the time at which the UE detects any path of the beam whose signal level is above certain threshold (e.g., path whose signal strength is larger than certain threshold). In another example the received timing of a beam at the UE (e.g., T$_{T1, B0}$ for B$_0$) may correspond to the time at which the UE detects the first path in time of the beam whose signal level is above certain threshold (e.g., the first path occurring in time whose signal strength is larger than certain threshold).

In (220), the UE higher layers trigger the UE to transmit data using PUR resources. This may be triggered for example upon arrival of data in the UE buffer. The transmission of data using PUR resources requires the UE to validate the previously received TA prior to transmission.

In (230), the UE is determining the received timing (e.g., time of arrival) of the current beam ($B_1$), where the received beam timing is denoted as $T_{T2, B1}$, and where $T_{T2, B1}$ is determined/measured within the interval T2–Δt21. As an example, Δt21 may comprise one or multiple DRX cycles or one or more time resources (e.g., L2 slots, etc.). As an example, Δt21=0. The relation between $B_0$ and $B_1$ and T1 and T2 are discussed above.

In (240), the UE is comparing determined beam timings $T_{T1, B0}$ and $T_{T2, B1}$ using one or more functions to a threshold called H1 (e.g., time-difference threshold). More specifically, the UE evaluates/calculates a magnitude of the absolute difference (e.g., TDOA magnitude of difference) between $T_{T1, B0}$ and $T_{T2, B1}$, compares the magnitude of the absolute difference with the threshold H1, and based on a result of the comparison, the UE determines whether the TA is valid. The comparison is done using a network configurable, preconfigured, or predefined threshold H1. The TA is considered as valid when following condition is fulfilled:

$$|T_{T1,B0}-T_{T2,B1}| \le H1$$

Example values of H1 are CP/N where N=2, 3, 4, etc. In another example, H1 is the timing difference between one SSB around T1±Δt11 and the current received beam timing. In yet another example, H1 is related to the Timing Alignment Timer (TAT) value, e.g., H1 is less than or larger than the configured TAT value. The values of H1 or N are configured or predefined such that the transmitted SDT/PUR transmission/signals can be received by the serving network node, e.g., they are received by the base station received within a certain time period (e.g., within X % of the cyclic prefix of the uplink symbol (e.g., X=30, 50, etc.), signal transmitted by the UE can be decodable by the base station receiver etc. Otherwise, the PUR/SDT transmission become a failed transmission.

The UE then proceeds to step (250) if the condition in (240) is met (e.g., the magnitude of the received timing difference between serving beams at $T_{T1, B0}$ and $T_{T2, B1}$ is less or equal to H1). In this case, the TA is considered valid, and UE may perform the associated actions such as transmitting the data using the preconfigured uplink resources, informing other nodes or higher layers that TA is valid, start a subsequent TA validation (e.g., checks if a timer association with TA validation is running or has expired), etc. On the other hand, if the condition in (240) is not met, then the UE performs the actions in (225) which include performing fallback procedures to validate the TA and/or declaring and/or considering that the TA is invalid. The actions in (225) may also include performing one or more associated actions such as informing other nodes or higher layers that TA is invalid. Additional examples of the associated actions include dropping, delaying, and/or suspending the data transmissions, or carrying out the transmission using other fallback procedures. Examples of fallback procedures include sending data by setting up dedicated communication link, by using random access transmission, etc.

Embodiment 2: Methods in the UE for Selecting TA Validation Method

Figure 3:
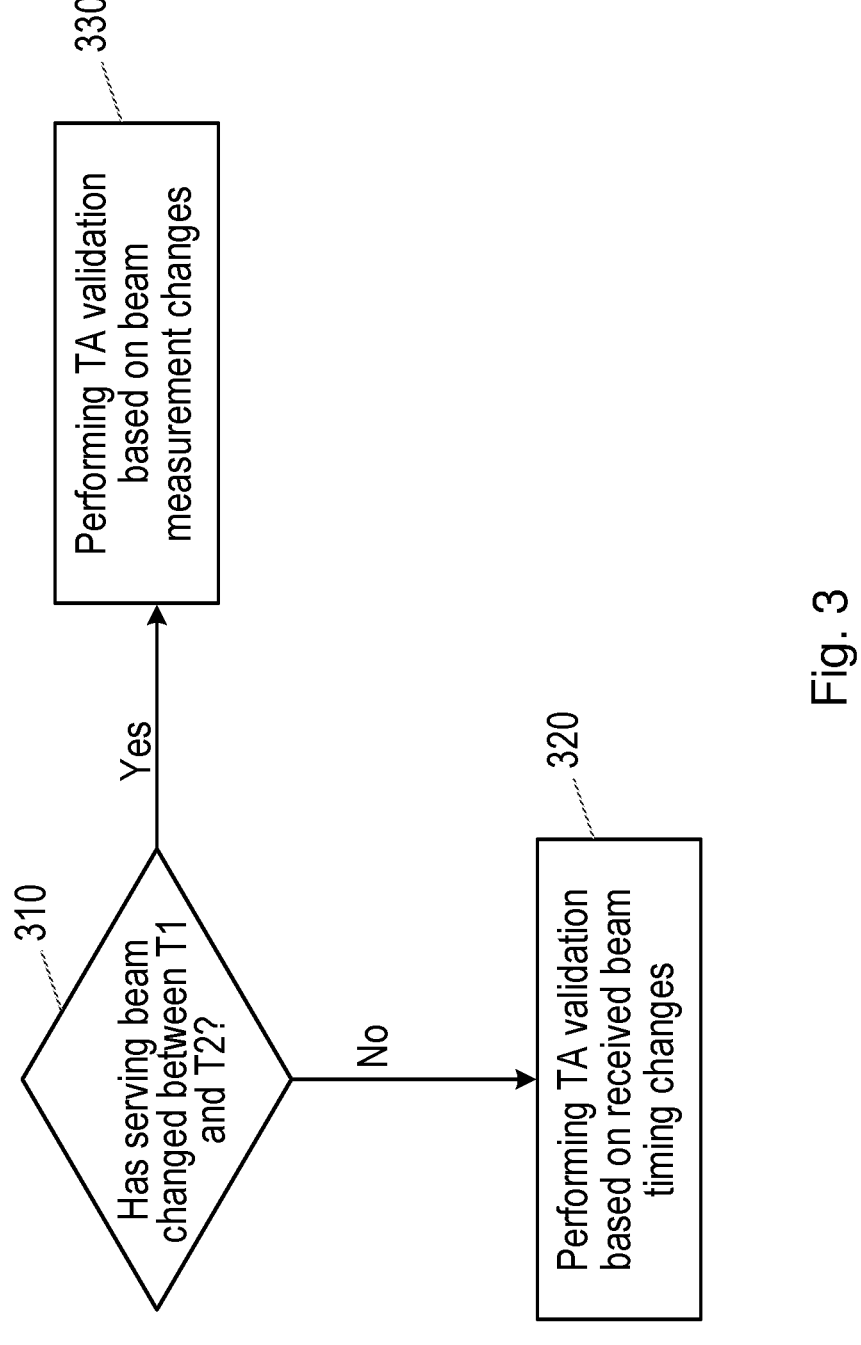
FIG. 3 depicts an example process associated with TDOA and measurement-based TA validation for CG-SDT transmission.

Another example embodiment comprises a scenario where it is assumed that the UE is configured with at least two different methods for validating the TA, namely method A and method B. Method A is based on received timing difference of the serving beams ($T_{T1, B0}$ and $T_{T2, B1}$) for validating the TA (e.g., TDOA-based TA validation), and method B is based on difference between beam measurements (e.g., signal strength measurements) for validating the TA (e.g., signal strength-based TA validation). An example procedure is illustrated in FIG. 3.

As the first condition in this process of validating the TA, at (310), the UE checks whether any serving beam change has occurred between time T1 and T2 in the UE. In one exemplary embodiment, as shown at (320), UE selects method A that is based on received timing changes (as described in embodiment 1) if UE has not performed any beam changes between T1 and T2 (e.g., $B_0=B_1$). In this case, UE performs TDOA-based TA validation described with respect to FIG. 1.

On the other hand, as shown at (330), if it is determined that UE has performed serving beam change (e.g., $B_0 \ne B_1$), then UE selects method B and performs signal strength-based TA validation that is based on changes in beam measurements.

In another exemplary embodiment, if serving beam has changed between T1 and T2, and if the number of serving beams of the UE between T1 and T2 has changed by at least a threshold (e.g., K number of beam changes or if UE has had K number of serving beams) then UE selects method B. Otherwise, UE selects method A for validating the TA. The parameter K can be pre-defined or configured by the network node. As an example, K=1.

If the serving beam of the UE at T2 is the same as it was at T1 then the UE assumes that the beam has not changed. This is represented by the following expression: $B_0=B_1$. But if the serving beam of the UE at T2 is different than the serving beam at T1 then the UE assumes that at least one beam has changed. This is represented by the following expression: $B_0 \# B_1$. The serving beam may have changed for different reasons such as changes in the UE's geographical position, changes in radio conditions (e.g., increased interference), changes NW configuration (e.g., number of beams reconfigured, different power settings, etc. On the other hand, if the number of serving beams has not changed by more than K number of beams between T1 and T2 (e.g., for K=1; $B_0=B_1$), then the UE selects and follows the steps associated with method A.

In addition, if the number of serving beams of the UE between T1 and T2 has not changed by K, but the new beam is not associated with the configured SDT resource (originally configured), then the UE assumes that the TA is invalid.

In another example, the UE checks whether any serving beam change has occurred between time T1 and T2 in the UE. If it was determined that beam has changed, then UE uses the method based on the received beam timing changes aka method A.

In yet another example, the UE checks whether any serving beam change has occurred between time T1 and T2 in the UE. If it was determined that beam has not changed, then UE uses the signal strength-based TA validation method (also referred to as the cell-level measurement change method).

As stated earlier, method B is based on beam signal measurement changes of the beams at T1±Δt12 and T2–Δt22. As an example, Δt12=0 and Δt22=0. The signal level measurement related to serving beam is explained with respect to FIG. 1 and called $BM_0$ and $BM_1$. Following method B, the UE compares $BM_0$ and $BM_1$ using one or more functions to a threshold called H1. More specifically, the UE evaluates the magnitude of the absolute difference between BM1 and BM2 (e.g., SS magnitude of difference), and based on that result decides whether the TA is valid. The comparison is done using a network configurable, preconfigured or predefined threshold H1 (e.g., SS-difference threshold). In some aspects, TA is considered as valid when following condition is fulfilled:

$$|BM1-BM2| \leq H1$$

Example values of H1 are 2 dB, 4 dB, 6 dB etc. H1 may also be related to the measurement accuracy levels associated with the type of measurement $BM_0$ and $BM_1$ are. In one specific example, H1 is referred to the relative RSRP level. In another examples, H1 is related to the relative RSRP level by a certain value, e.g., H1=J*Relative RSRP level. Examples of functions used in the comparison are, averaged values of BM1/BM2 are compared to H1, instantaneous measured value of BM1/BM2 are compared to H1, relation between BM1 and BM2 is compared to H1, etc.

In another example, the UE determines its geographical location with respect to the serving network node and selects method A if it is determined to be near the serving network node (e.g., within a threshold distance). Otherwise, it selects method B. In one example, if the distance between the UE and serving network node is less than a configurable or predefined threshold, then it selects method A. The motivation is that if UE is near the serving node, the coverage can be expected to be good and thus probability of changing the beam is small. On the other hand, if the distance is greater than the said threshold, then UE selects method B for validating the TA because the coverage may be poorer and thus UE may expect changes in e.g., environment resulting in beam changes.

In an example, if the UE is configured to apply 2-step RA procedure for random access then UE may select and follow method A for validating the TA while it follows method B if it is configured with 4-step RA. The motivation is that 2-step RA is typically configured when the cell size is small and UE is located relatively near the serving network node.

Figure 4:
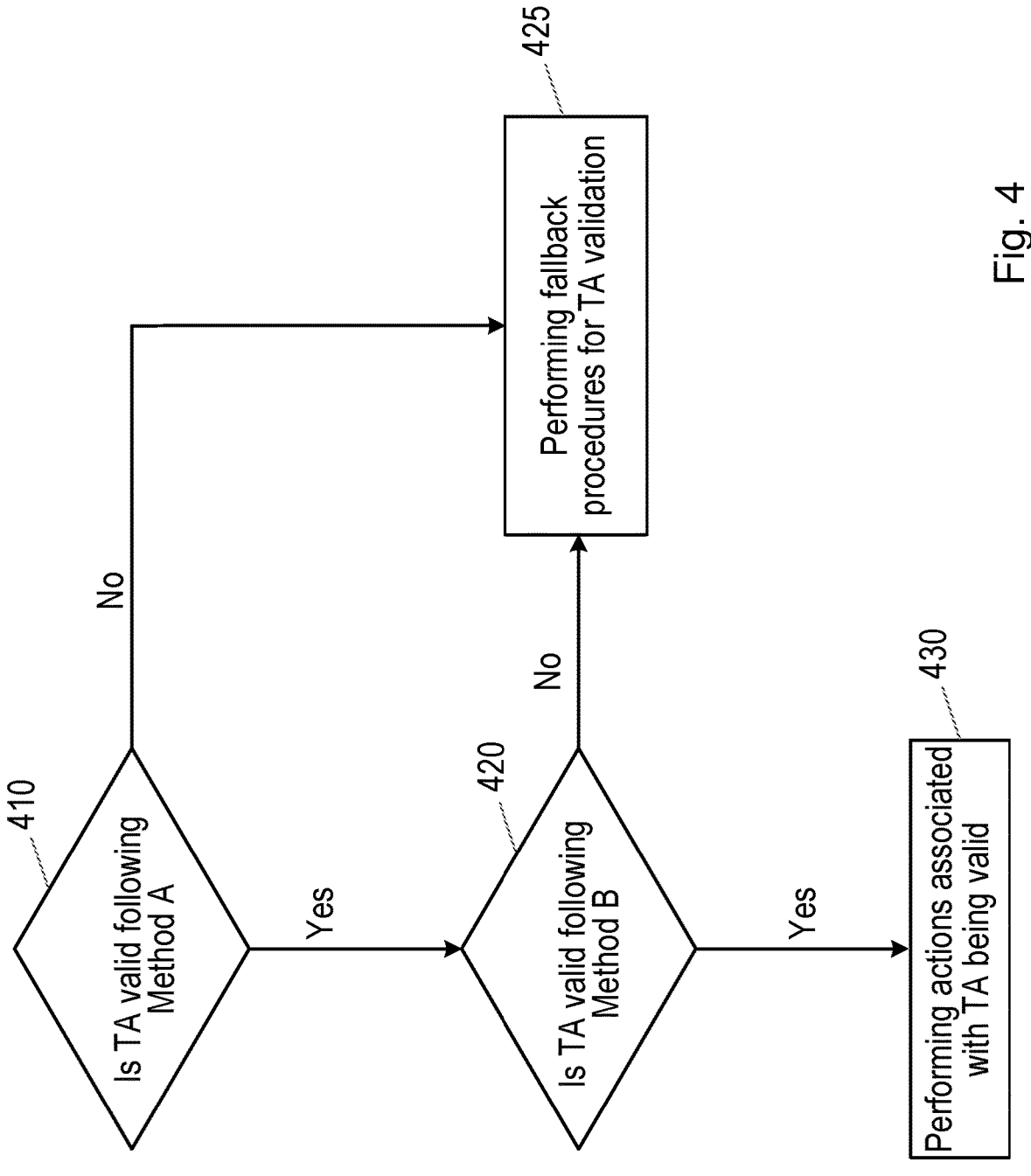
FIG. 4 depicts an example process associated with TDOA and measurement-based TA validation for CG-SDT transmission.

Embodiment 3: Methods in the UE for Validating TA Based on Received Beam Timing Changes and Beam Measurements Another example embodiment comprises a scenario where it is assumed that the UE is configured with at least two different methods for validating the TA, namely method A and method B. As discussed previously, method A is based on received timing difference of the serving beams at $T_{T1, B0}$ and $T_{T2, B1}$ for validating the TA, and method B uses difference between beam measurements for validating the TA. The procedure is illustrated in FIG. 4.

The UE is further configured with a rule or follows a predefined rule for validating the TA, the said rule specifies the order in which the methods are applied and their relation for validating the TA. Examples of relation include:

TA is valid if TA is considered valid following at least one of the two methods

TA is valid if TA is considered valid following both methods

In a first example, it is assumed that the order is such that UE starts validating the TA following method A first (410) and proceeds to method B (420) when the outcome of method A is that TA is valid. Otherwise, if TA is considered invalid according method A, UE performs the fallback procedure (without proceeding to method B) shown in (425)

which includes declaring and/or considering the TA as invalid. The actions in (425) may also include performing one or more associated actions such as informing other nodes or higher layers that TA is invalid. Additional examples of the associated actions include dropping, delaying, and/or suspending the data transmissions, or carrying out the transmission using other fallback procedures. Examples of fallback procedures include sending data by setting up dedicated communication link, by using random access transmission, etc.

If, at (420), TA is considered valid also following method B, then TA is considered valid for SDT transmission and the UE may perform the associated actions such as transmitting the data using the preconfigured uplink resources, informing other nodes or higher layers that TA is valid, start a subsequent TA validation (e.g., checks if a timer association with TA validation is running or has expired), etc.

In a second example, it is assumed that the order is such that UE starts validating the TA following method B first (420) and proceeds to method A (410) when the outcome of method B is that TA is valid. The UE behavior in this example is similar to those explained in previous example with inverse order.

In a third example, it is assumed that the UE is configured with any order for validating the TA, e.g., UE may start with method A or method B. Additionally, the UE may proceed to the subsequent method (method B if UE started with method A, or method A if UE started with method B) even if TA is considered invalid using the first validation method. In other words, the UE declares the TA as valid if TA is considered valid using at least one of the configured validation methods. When TA is determined to be valid, the UE may proceed to (430) to perform actions such as transmitting the data using the preconfigured uplink resources, informing other nodes or higher layers that TA is valid, start a subsequent TA validation (e.g., checks if a timer association with TA validation is running or has expired), etc.

Figure 5:
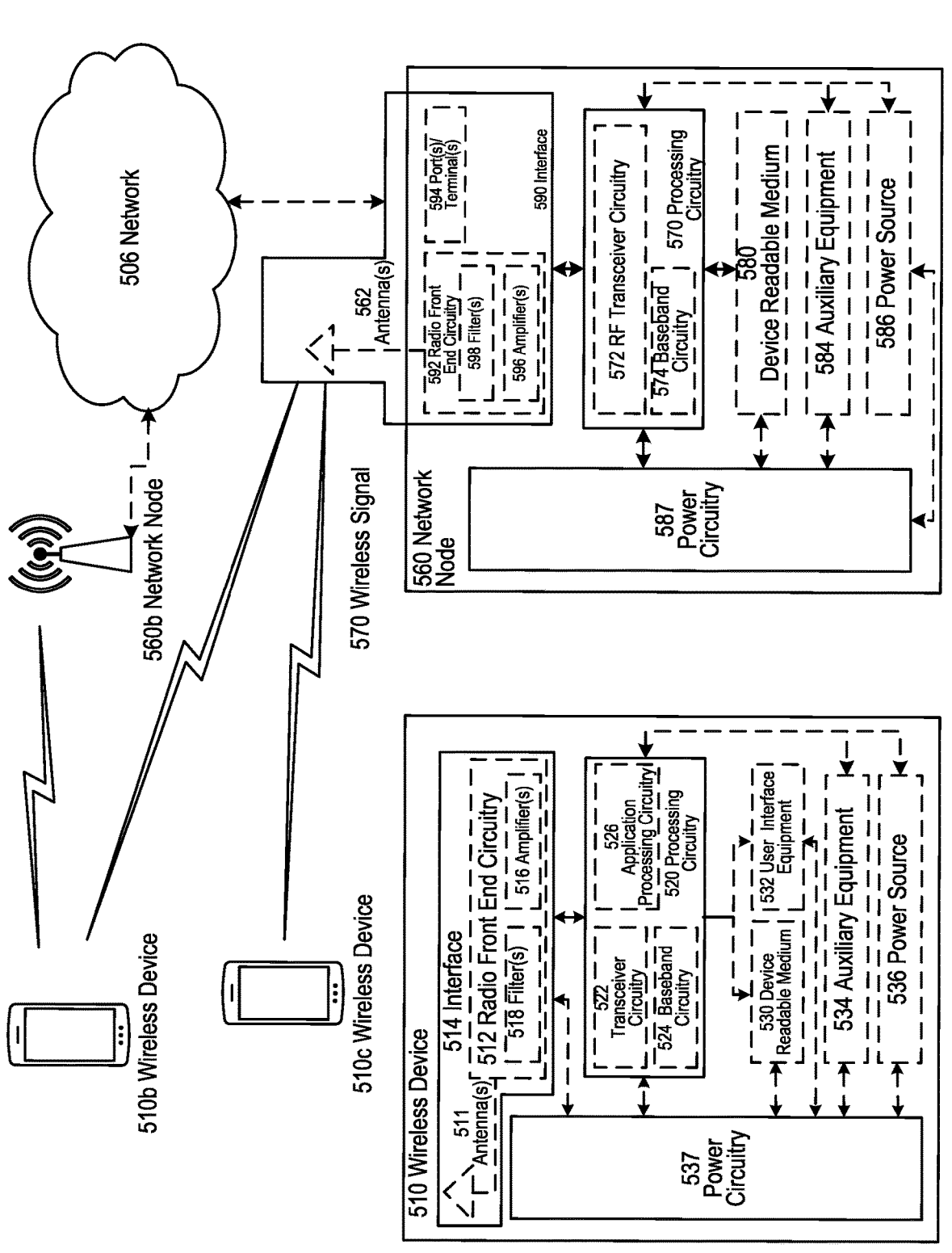
FIG. 5 depicts a wireless network in accordance with some embodiments.

Although the subject matter described herein may be implemented in any appropriate type of system using any suitable components, the embodiments disclosed herein are described in relation to a wireless network, such as the example wireless network illustrated in FIG. 5. For simplicity, the wireless network of FIG. 5 depicts network 506, network nodes 560 and 560b, and WDs 510, 510b, and 510c. In practice, a wireless network may further include any additional elements suitable to support communication between wireless devices or between a wireless device and another communication device, such as a landline telephone, a service provider, or any other network node or end device. Of the illustrated components, network node 560 and wireless device (WD) 510 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 506 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 560 and WD 510 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 5, network node 560 includes processing circuitry 570, device readable medium 580, interface 590, auxiliary equipment 584, power source 586, power circuitry 587, and antenna 562. Although network node 560 illustrated in the example wireless network of FIG. 5 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 560 are depicted as single boxes located within a larger box, or nested within multiple boxes, in practice, a network node may comprise multiple different physical components that make up a single illustrated component (e.g., device readable medium 580 may comprise multiple separate hard drives as well as multiple RAM modules).

Similarly, network node 560 may be composed of multiple physically separate components (e.g., a NodeB component and a RNC component, or a BTS component and a BSC component, etc.), which may each have their own respective components. In certain scenarios in which network node 560 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 560 may be configured to support multiple radio access technologies (RATs). In such embodiments, some components may be duplicated (e.g., separate device readable medium 580 for the different RATs) and some components may be reused (e.g., the same antenna 562 may be shared by the RATs). Network node 560 may also include multiple sets of the various illustrated components for different wireless technologies integrated into network node 560, such as, for example, GSM, WCDMA, LTE, NR, WiFi, or Bluetooth wireless technologies. These wireless technologies may be integrated into the same or different chip or set of chips and other components within network node 560.

Processing circuitry 570 is configured to perform any determining, calculating, or similar operations (e.g., certain obtaining operations) described herein as being provided by a network node. These operations performed by processing circuitry 570 may include processing information obtained by processing circuitry 570 by, for example, converting the obtained information into other information, comparing the obtained information or converted information to information stored in the network node, and/or performing one or more operations based on the obtained information or converted information, and as a result of said processing making a determination.

Processing circuitry 570 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 560 components, such as device readable medium 580, network node 560 functionality. For example, processing circuitry 570 may execute instructions stored in device readable medium 580 or in memory within processing circuitry 570. Such functionality may include providing any of the various wireless features, functions, or benefits discussed herein. In some embodiments, processing circuitry 570 may include a system on a chip (SOC).

In some embodiments, processing circuitry 570 may include one or more of radio frequency (RF) transceiver circuitry 572 and baseband processing circuitry 574. In some embodiments, radio frequency (RF) transceiver circuitry 572 and baseband processing circuitry 574 may be on separate chips (or sets of chips), boards, or units, such as radio units and digital units. In alternative embodiments, part or all of RF transceiver circuitry 572 and baseband processing circuitry 574 may be on the same chip or set of chips, boards, or units In certain embodiments, some or all of the functionality described herein as being provided by a network node, base station, eNB or other such network device may be performed by processing circuitry 570 executing instructions stored on device readable medium 580 or memory within processing circuitry 570. In alternative embodiments, some or all of the functionality may be provided by processing circuitry 570 without executing instructions stored on a separate or discrete device readable medium, such as in a hard-wired manner In any of those embodiments, whether executing instructions stored on a device readable storage medium or not, processing circuitry 570 can be configured to perform the described functionality. The benefits provided by such functionality are not limited to processing circuitry 570 alone or to other components of network node 560, but are enjoyed by network node 560 as a whole, and/or by end users and the wireless network generally.

Device readable medium 580 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 570. Device readable medium 580 may store any suitable instructions, data or information, including a computer program, software, an application including one or more of logic, rules, code, tables, etc. and/or other instructions capable of being executed by processing circuitry 570 and, utilized by network node 560. Device readable medium 580 may be used to store any calculations made by processing circuitry 570 and/or any data received via interface 590. In some embodiments, processing circuitry 570 and device readable medium 580 may be considered to be integrated.

Interface 590 is used in the wired or wireless communication of signaling and/or data between network node 560, network 506, and/or WDs 510. As illustrated, interface 590 comprises port(s)/terminal(s) 594 to send and receive data, for example to and from network 506 over a wired connection. Interface 590 also includes radio front end circuitry 592 that may be coupled to, or in certain embodiments a part of, antenna 562. Radio front end circuitry 592 comprises filters 598 and amplifiers 596. Radio front end circuitry 592 may be connected to antenna 562 and processing circuitry 570. Radio front end circuitry may be configured to condition signals communicated between antenna 562 and processing circuitry 570. Radio front end circuitry 592 may receive digital data that is to be sent out to other network nodes or WDs via a wireless connection. Radio front end circuitry 592 may convert the digital data into a radio signal having the appropriate channel and bandwidth parameters using a combination of filters 598 and/or amplifiers 596. The radio signal may then be transmitted via antenna 562. Similarly, when receiving data, antenna 562 may collect radio signals which are then converted into digital data by radio front end circuitry 592. The digital data may be passed to processing circuitry 570. In other embodiments, the interface may comprise different components and/or different combinations of components.

In certain alternative embodiments, network node 560 may not include separate radio front end circuitry 592, instead, processing circuitry 570 may comprise radio front end circuitry and may be connected to antenna 562 without separate radio front end circuitry 592. Similarly, in some embodiments, all or some of RF transceiver circuitry 572 may be considered a part of interface 590. In still other embodiments, interface 590 may include one or more ports or terminals 594, radio front end circuitry 592, and RF transceiver circuitry 572, as part of a radio unit (not shown), and interface 590 may communicate with baseband processing circuitry 574, which is part of a digital unit (not shown).

Antenna 562 may include one or more antennas, or antenna arrays, configured to send and/or receive wireless signals. Antenna 562 may be coupled to radio front end circuitry 590 and may be any type of antenna capable of transmitting and receiving data and/or signals wirelessly. In some embodiments, antenna 562 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 562 may be separate from network node 560 and may be connectable to network node 560 through an interface or port.

Antenna 562, interface 590, and/or processing circuitry 570 may be configured to perform any receiving operations and/or certain obtaining operations described herein as being performed by a network node. Any information, data and/or signals may be received from a wireless device, another network node and/or any other network equipment. Similarly, antenna 562, interface 590, and/or processing circuitry 570 may be configured to perform any transmitting operations described herein as being performed by a network node. Any information, data and/or signals may be transmitted to a wireless device, another network node and/or any other network equipment.

Power circuitry 587 may comprise, or be coupled to, power management circuitry and is configured to supply the components of network node 560 with power for performing the functionality described herein. Power circuitry 587 may receive power from power source 586. Power source 586 and/or power circuitry 587 may be configured to provide power to the various components of network node 560 in a form suitable for the respective components (e.g., at a voltage and current level needed for each respective component). Power source 586 may either be included in, or external to, power circuitry 587 and/or network node 560. For example, network node 560 may be connectable to an external power source (e.g., an electricity outlet) via an input circuitry or interface such as an electrical cable, whereby the external power source supplies power to power circuitry 587. As a further example, power source 586 may comprise a source of power in the form of a battery or battery pack which is connected to, or integrated in, power circuitry 587. The battery may provide backup power should the external power source fail. Other types of power sources, such as photovoltaic devices, may also be used.

Alternative embodiments of network node 560 may include additional components beyond those shown in FIG. 5 that may be responsible for providing certain aspects of the network node's functionality, including any of the functionality described herein and/or any functionality necessary to support the subject matter described herein. For example, network node 560 may include user interface equipment to allow input of information into network node 560 and to allow output of information from network node 560. This may allow a user to perform diagnostic, maintenance, repair, and other administrative functions for network node 560.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 510 includes antenna 511, interface 514, processing circuitry 520, device readable medium 530, user interface equipment 532, auxiliary equipment 534, power source 536 and power circuitry 537. WD 510 may include multiple sets of one or more of the illustrated components for different wireless technologies supported by WD 510, such as, for example, GSM, WCDMA, LTE, NR, WiFi, WiMAX, or Bluetooth wireless technologies, just to mention a few. These wireless technologies may be integrated into the same or different chips or set of chips as other components within WD 510.

Antenna 511 may include one or more antennas or antenna arrays, configured to send and/or receive wireless signals, and is connected to interface 514. In certain alternative embodiments, antenna 511 may be separate from WD 510 and be connectable to WD 510 through an interface or port. Antenna 511, interface 514, and/or processing circuitry 520 may be configured to perform any receiving or transmitting operations described herein as being performed by a WD. Any information, data and/or signals may be received from a network node and/or another WD. In some embodiments, radio front end circuitry and/or antenna 511 may be considered an interface.

As illustrated, interface 514 comprises radio front end circuitry 512 and antenna 511. Radio front end circuitry 512 comprise one or more filters 518 and amplifiers 516. Radio front end circuitry 514 is connected to antenna 511 and processing circuitry 520, and is configured to condition signals communicated between antenna 511 and processing circuitry 520. Radio front end circuitry 512 may be coupled to or a part of antenna 511. In some embodiments, WD 510 may not include separate radio front end circuitry 512; rather, processing circuitry 520 may comprise radio front end circuitry and may be connected to antenna 511. Similarly, in some embodiments, some or all of RF transceiver circuitry 522 may be considered a part of interface 514. Radio front end circuitry 512 may receive digital data that is to be sent out to other network nodes or WDs via a wireless connection. Radio front end circuitry 512 may convert the digital data into a radio signal having the appropriate channel and bandwidth parameters using a combination of filters 518 and/or amplifiers 516. The radio signal may then be transmitted via antenna 511. Similarly, when receiving data, antenna 511 may collect radio signals which are then converted into digital data by radio front end circuitry 512. The digital data may be passed to processing circuitry 520. In other embodiments, the interface may comprise different components and/or different combinations of components.

Processing circuitry 520 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 510 components, such as device readable medium 530, WD 510 functionality. Such functionality may include providing any of the various wireless features or benefits discussed herein. For example, processing circuitry 520 may execute instructions stored in device readable medium 530 or in memory within processing circuitry 520 to provide the functionality disclosed herein.

As illustrated, processing circuitry 520 includes one or more of RF transceiver circuitry 522, baseband processing circuitry 524, and application processing circuitry 526. In other embodiments, the processing circuitry may comprise different components and/or different combinations of components. In certain embodiments processing circuitry 520 of WD 510 may comprise a SOC. In some embodiments, RF transceiver circuitry 522, baseband processing circuitry 524, and application processing circuitry 526 may be on separate chips or sets of chips. In alternative embodiments, part or all of baseband processing circuitry 524 and application processing circuitry 526 may be combined into one chip or set of chips, and RF transceiver circuitry 522 may be on a separate chip or set of chips. In still alternative embodiments, part or all of RF transceiver circuitry 522 and baseband processing circuitry 524 may be on the same chip or set of chips, and application processing circuitry 526 may be on a separate chip or set of chips. In yet other alternative embodiments, part or all of RF transceiver circuitry 522, baseband processing circuitry 524, and application processing circuitry 526 may be combined in the same chip or set of chips. In some embodiments, RF transceiver circuitry 522 may be a part of interface 514. RF transceiver circuitry 522 may condition RF signals for processing circuitry 520.

In certain embodiments, some or all of the functionality described herein as being performed by a WD may be provided by processing circuitry 520 executing instructions stored on device readable medium 530, which in certain embodiments may be a computer-readable storage medium. In alternative embodiments, some or all of the functionality may be provided by processing circuitry 520 without executing instructions stored on a separate or discrete device readable storage medium, such as in a hard-wired manner. In any of those particular embodiments, whether executing instructions stored on a device readable storage medium or not, processing circuitry 520 can be configured to perform the described functionality. The benefits provided by such functionality are not limited to processing circuitry 520 alone or to other components of WD 510, but are enjoyed by WD 510 as a whole, and/or by end users and the wireless network generally.

Processing circuitry 520 may be configured to perform any determining, calculating, or similar operations (e.g., certain obtaining operations) described herein as being performed by a WD. These operations, as performed by processing circuitry 520, may include processing information obtained by processing circuitry 520 by, for example, converting the obtained information into other information, comparing the obtained information or converted information to information stored by WD 510, and/or performing one or more operations based on the obtained information or converted information, and as a result of said processing making a determination.

Device readable medium 530 may be operable to store a computer program, software, an application including one or more of logic, rules, code, tables, etc. and/or other instructions capable of being executed by processing circuitry 520. Device readable medium 530 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 520. In some embodiments, processing circuitry 520 and device readable medium 530 may be considered to be integrated.

User interface equipment 532 may provide components that allow for a human user to interact with WD 510. Such interaction may be of many forms, such as visual, audial, tactile, etc. User interface equipment 532 may be operable to produce output to the user and to allow the user to provide input to WD 510. The type of interaction may vary depending on the type of user interface equipment 532 installed in WD 510. For example, if WD 510 is a smart phone, the interaction may be via a touch screen; if WD 510 is a smart meter, the interaction may be through a screen that provides usage (e.g., the number of gallons used) or a speaker that provides an audible alert (e.g., if smoke is detected). User interface equipment 532 may include input interfaces, devices and circuits, and output interfaces, devices and circuits. User interface equipment 532 is configured to allow input of information into WD 510, and is connected to processing circuitry 520 to allow processing circuitry 520 to process the input information. User interface equipment 532 may include, for example, a microphone, a proximity or other sensor, keys/buttons, a touch display, one or more cameras, a USB port, or other input circuitry. User interface equipment 532 is also configured to allow output of information from WD 510, and to allow processing circuitry 520 to output information from WD 510. User interface equipment 532 may include, for example, a speaker, a display, vibrating circuitry, a USB port, a headphone interface, or other output circuitry. Using one or more input and output interfaces, devices, and circuits, of user interface equipment 532, WD 510 may communicate with end users and/or the wireless network, and allow them to benefit from the functionality described herein.

Auxiliary equipment 534 is operable to provide more specific functionality which may not be generally performed by WDs. This may comprise specialized sensors for doing measurements for various purposes, interfaces for additional types of communication such as wired communications etc. The inclusion and type of components of auxiliary equipment 534 may vary depending on the embodiment and/or scenario.

Power source 536 may, in some embodiments, be in the form of a battery or battery pack. Other types of power sources, such as an external power source (e.g., an electricity outlet), photovoltaic devices or power cells, may also be used. WD 510 may further comprise power circuitry 537 for delivering power from power source 536 to the various parts of WD 510 which need power from power source 536 to carry out any functionality described or indicated herein. Power circuitry 537 may in certain embodiments comprise power management circuitry. Power circuitry 537 may additionally or alternatively be operable to receive power from an external power source; in which case WD 510 may be connectable to the external power source (such as an electricity outlet) via input circuitry or an interface such as an electrical power cable. Power circuitry 537 may also in certain embodiments be operable to deliver power from an external power source to power source 536. This may be, for example, for the charging of power source 536. Power circuitry 537 may perform any formatting, converting, or other modification to the power from power source 536 to make the power suitable for the respective components of WD 510 to which power is supplied.

Figure 6:
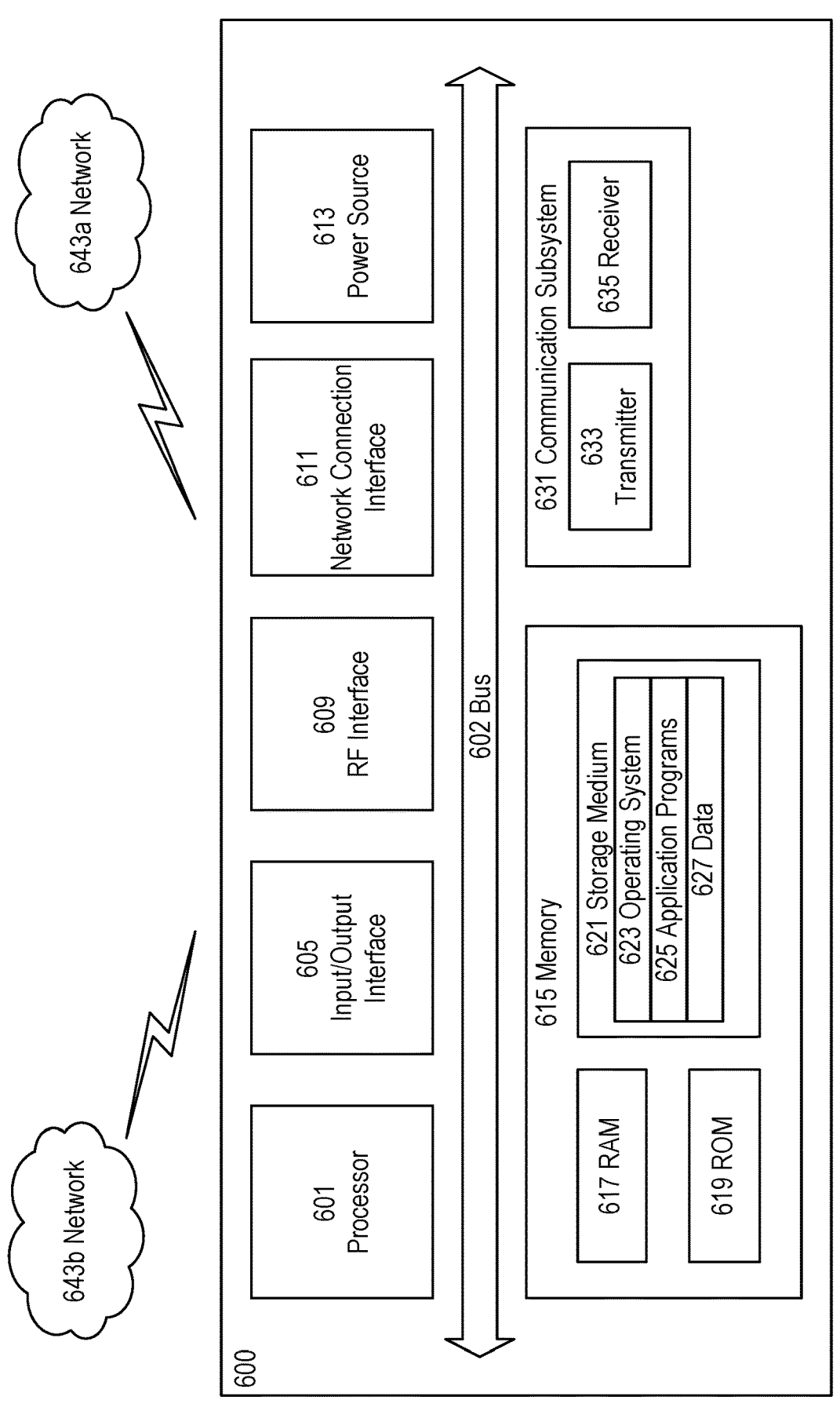
FIG. 6 depicts a user equipment in accordance with some embodiments.

FIG. 6 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 6200 may be any UE identified by the 3$^{rd}$ Generation Partnership Project (3GPP), including a NB-IoT UE, a machine type communication (MTC) UE, and/or an enhanced MTC (eMTC) UE. UE 600, as illustrated in FIG.

6, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 6 is a UE, the components discussed herein are equally applicable to a WD, and vice-versa.

In FIG. 6, UE 600 includes processing circuitry 601 that is operatively coupled to input/output interface 605, radio frequency (RF) interface 609, network connection interface 611, memory 615 including random access memory (RAM) 617, read-only memory (ROM) 619, and storage medium 621 or the like, communication subsystem 631, power source 633, and/or any other component, or any combination thereof. Storage medium 621 includes operating system 623, application program 625, and data 627. In other embodiments, storage medium 621 may include other similar types of information. Certain UEs may utilize all of the components shown in FIG. 6, or a subset of the components. The level of integration between the components may vary from one UE to another UE. Further, certain UEs may contain multiple instances of a component, such as multiple processors, memories, transceivers, transmitters, receivers, etc.

In FIG. 6, processing circuitry 601 may be configured to process computer instructions and data. Processing circuitry 601 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 601 may include two central processing units (CPUs). Data may be information in a form suitable for use by a computer.

In the depicted embodiment, input/output interface 605 may be configured to provide a communication interface to an input device, output device, or input and output device. UE 600 may be configured to use an output device via input/output interface 605. An output device may use the same type of interface port as an input device. For example, a USB port may be used to provide input to and output from UE 600. The output device may be a speaker, a sound card, a video card, a display, a monitor, a printer, an actuator, an emitter, a smartcard, another output device, or any combination thereof. UE 600 may be configured to use an input device via input/output interface 605 to allow a user to capture information into UE 600. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 6, RF interface 609 may be configured to provide a communication interface to RF components such as a transmitter, a receiver, and an antenna. Network connection interface 611 may be configured to provide a communication interface to network 643a. Network 643a may encompass wired and/or wireless networks such as a local-area network (LAN), a wide-area network (WAN), a computer network, a wireless network, a telecommunications network, another like network or any combination thereof. For example, network 643a may comprise a Wi-Fi network. Network connection interface 611 may be configured to include a receiver and a transmitter interface used to communicate with one or more other devices over a communication network according to one or more communication protocols, such as Ethernet, TCP/IP, SONET, ATM, or the like. Network connection interface 611 may implement receiver and transmitter functionality appropriate to the communication network links (e.g., optical, electrical, and the like). The transmitter and receiver functions may share circuit components, software or firmware, or alternatively may be implemented separately.

RAM 617 may be configured to interface via bus 602 to processing circuitry 601 to provide storage or caching of data or computer instructions during the execution of software programs such as the operating system, application programs, and device drivers. ROM 619 may be configured to provide computer instructions or data to processing circuitry 601. For example, ROM 619 may be configured to store invariant low-level system code or data for basic system functions such as basic input and output (I/O), startup, or reception of keystrokes from a keyboard that are stored in a non-volatile memory. Storage medium 621 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 621 may be configured to include operating system 623, application program 625 such as a web browser application, a widget or gadget engine or another application, and data file 627. Storage medium 621 may store, for use by UE 600, any of a variety of various operating systems or combinations of operating systems.

Storage medium 621 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 621 may allow UE 600 to access computer-executable instructions, application programs or the like, stored on transitory or non-transitory memory media, to off-load data, or to upload data. An article of manufacture, such as one utilizing a communication system may be tangibly embodied in storage medium 621, which may comprise a device readable medium.

In FIG. 6, processing circuitry 601 may be configured to communicate with network 643b using communication subsystem 631. Network 643a and network 643b may be the same network or networks or different network or networks. Communication subsystem 631 may be configured to include one or more transceivers used to communicate with network 643b. For example, communication subsystem 631 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 633 and/or receiver 635 to implement transmitter or receiver functionality, respectively, appropriate to the RAN links (e.g., frequency allocations and the like). Further, transmitter 633 and receiver 635 of each transceiver may share circuit components, software or firmware, or alternatively may be implemented separately.

In the illustrated embodiment, the communication functions of communication subsystem 631 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 631 may include cellular communication, Wi-Fi communication, Bluetooth communication, and GPS communication. Network 643*b* may encompass wired and/or wireless networks such as a local-area network (LAN), a wide-area network (WAN), a computer network, a wireless network, a telecommunications network, another like network or any combination thereof. For example, network 643*b* may be a cellular network, a Wi-Fi network, and/or a near-field network. Power source 613 may be configured to provide alternating current (AC) or direct current (DC) power to components of UE 600.

The features, benefits and/or functions described herein may be implemented in one of the components of UE 600 or partitioned across multiple components of UE 600. Further, the features, benefits, and/or functions described herein may be implemented in any combination of hardware, software or firmware. In one example, communication subsystem 631 may be configured to include any of the components described herein. Further, processing circuitry 601 may be configured to communicate with any of such components over bus 602. In another example, any of such components may be represented by program instructions stored in memory that when executed by processing circuitry 601 perform the corresponding functions described herein. In another example, the functionality of any of such components may be partitioned between processing circuitry 601 and communication subsystem 631. In another example, the non-computationally intensive functions of any of such components may be implemented in software or firmware and the computationally intensive functions may be implemented in hardware.

Figure 7:
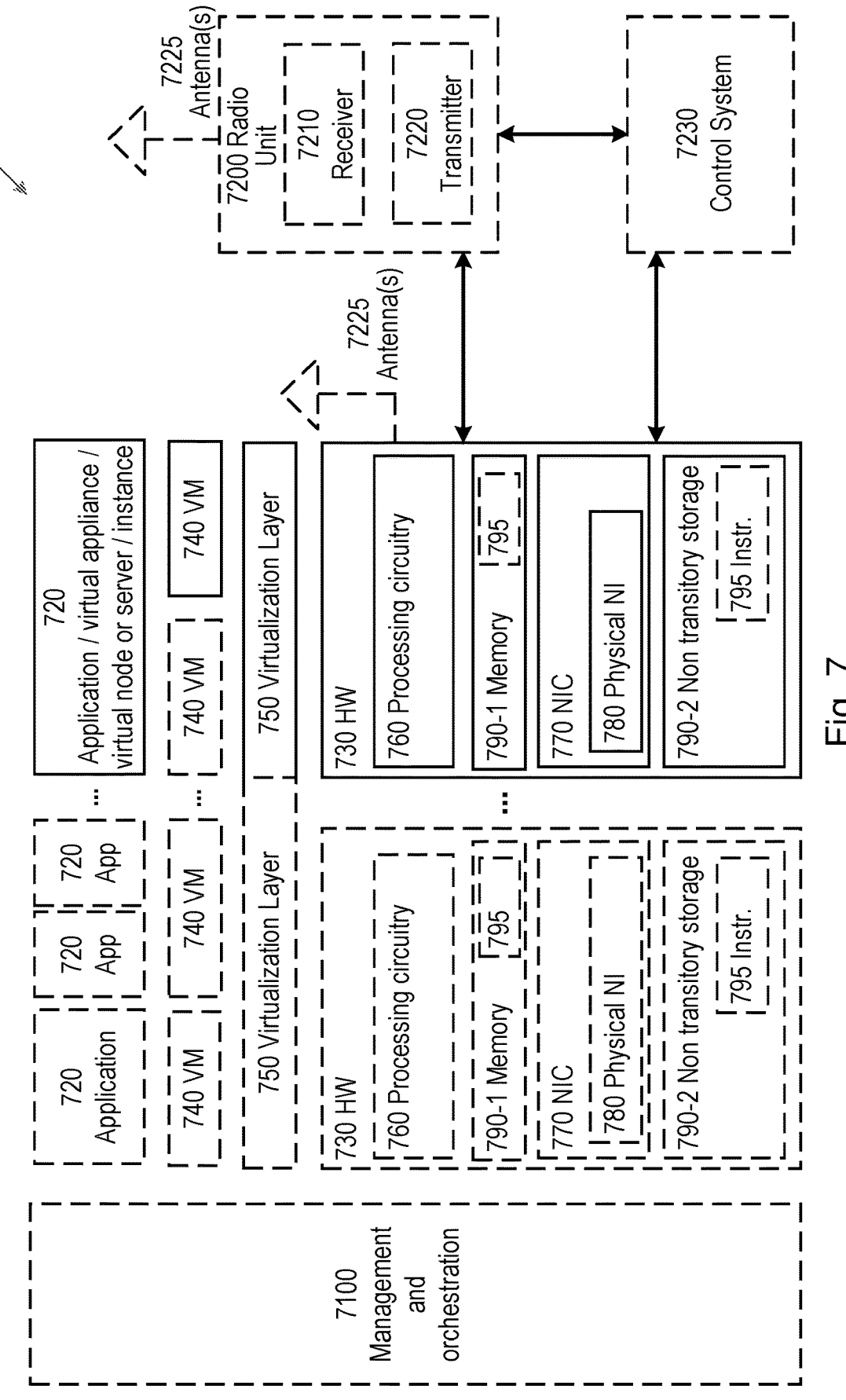
FIG. 7 depicts a virtualization environment in accordance with some embodiments.

FIG. 7 is a schematic block diagram illustrating a virtualization environment 700 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 700 hosted by one or more of hardware nodes 730. Further, in embodiments in which the virtual node is not a radio access node or does not require radio connectivity (e.g., a core network node), then the network node may be entirely virtualized.

The functions may be implemented by one or more applications 720 (which may alternatively be called software instances, virtual appliances, network functions, virtual nodes, virtual network functions, etc.) operative to implement some of the features, functions, and/or benefits of some of the embodiments disclosed herein. Applications 720 are run in virtualization environment 700 which provides hardware 730 comprising processing circuitry 760 and memory 790. Memory 790 contains instructions 795 executable by processing circuitry 760 whereby application 720 is operative to provide one or more of the features, benefits, and/or functions disclosed herein.

Virtualization environment 700, comprises general-purpose or special-purpose network hardware devices 730 comprising a set of one or more processors or processing circuitry 760, which may be commercial off-the-shelf (COTS) processors, dedicated Application Specific Integrated Circuits (ASICs), or any other type of processing circuitry including digital or analog hardware components or special-purpose processors. Each hardware device may comprise memory 790-1 which may be non-persistent memory for temporarily storing instructions 795 or software executed by processing circuitry 760. Each hardware device may comprise one or more network interface controllers (NICs) 770, also known as network interface cards, which include physical network interface 780. Each hardware device may also include non-transitory, persistent, machine-readable storage media 790-2 having stored therein software 795 and/or instructions executable by processing circuitry 760. Software 795 may include any type of software including software for instantiating one or more virtualization layers 750 (also referred to as hypervisors), software to execute virtual machines 740 as well as software allowing it to execute functions, features and/or benefits described in relation with some embodiments described herein.

Virtual machines 740, comprise virtual processing, virtual memory, virtual networking or interface and virtual storage, and may be run by a corresponding virtualization layer 750 or hypervisor. Different embodiments of the instance of virtual appliance 720 may be implemented on one or more of virtual machines 740, and the implementations may be made in different ways.

During operation, processing circuitry 760 executes software 795 to instantiate the hypervisor or virtualization layer 750, which may sometimes be referred to as a virtual machine monitor (VMM). Virtualization layer 750 may present a virtual operating platform that appears like networking hardware to virtual machine 740.

As shown in FIG. 7, hardware 730 may be a standalone network node with generic or specific components. Hardware 730 may comprise antenna 7225 and may implement some functions via virtualization. Alternatively, hardware 730 may be part of a larger cluster of hardware (e.g., such as in a data center or customer premise equipment (CPE)) where many hardware nodes work together and are managed via management and orchestration (MANO) 7100, which, among others, oversees lifecycle management of applications 720.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 740 may be a software implementation of a physical machine that runs programs as if they were executing on a physical, non-virtualized machine. Each of virtual machines 740, and that part of hardware 730 that executes that virtual machine, be it hardware dedicated to that virtual machine and/or hardware shared by that virtual machine with others of the virtual machines 740, forms a separate virtual network elements (VNE).

Still in the context of NFV, Virtual Network Function (VNF) is responsible for handling specific network functions that run in one or more virtual machines 740 on top of hardware networking infrastructure 730 and corresponds to application 720 in FIG. 7.

In some embodiments, one or more radio units 7200 that each include one or more transmitters 7220 and one or more receivers 7210 may be coupled to one or more antennas 7225. Radio units 7200 may communicate directly with hardware nodes 730 via one or more appropriate network interfaces and may be used in combination with the virtual components to provide a virtual node with radio capabilities, such as a radio access node or a base station.

In some embodiments, some signaling can be effected with the use of control system 7230 which may alternatively be used for communication between the hardware nodes 730 and radio units 7200.

Figure 8:
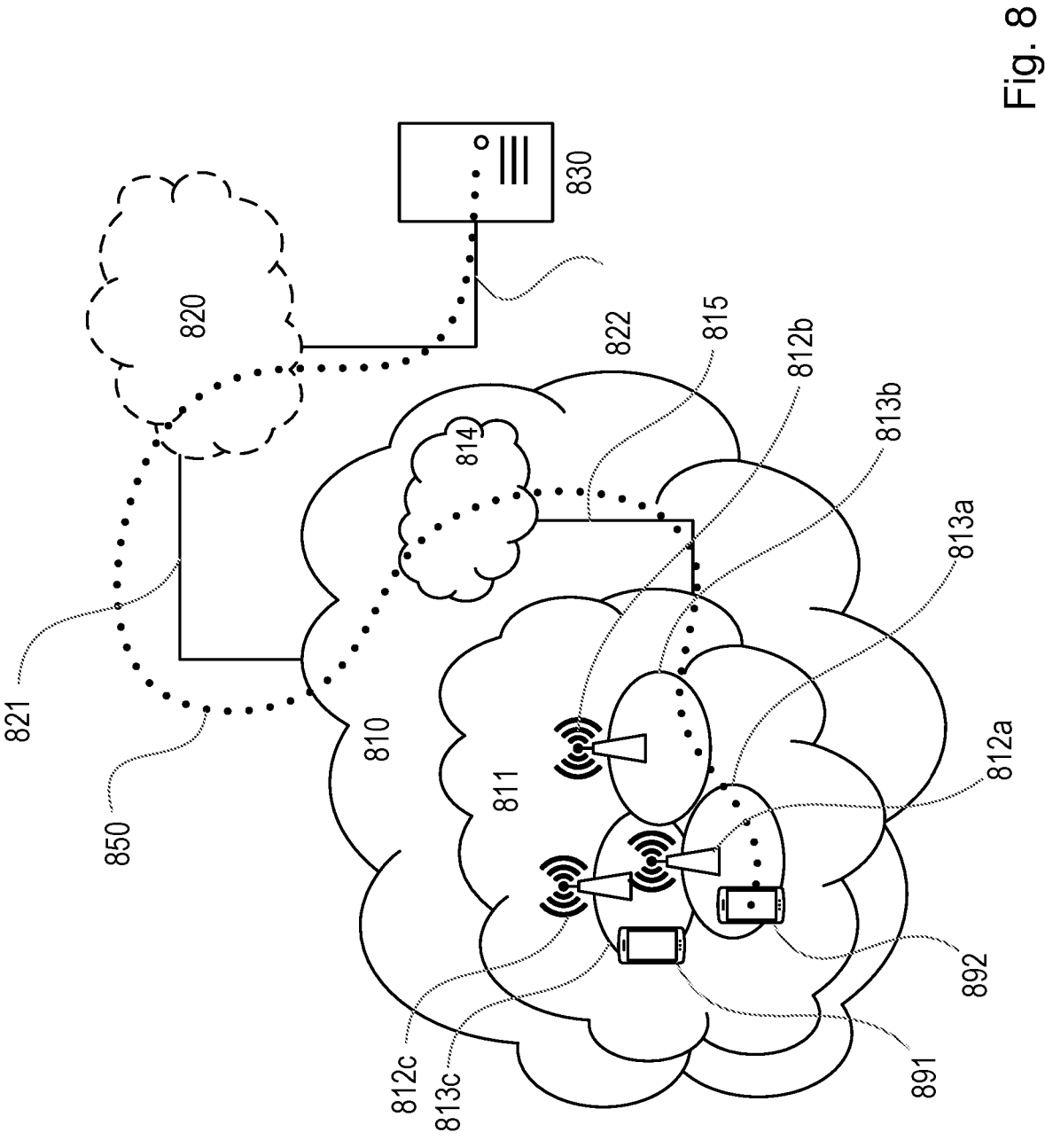
FIG. 8 depicts a network connected via an intermediate network to a host computer in accordance with some embodiments.

With reference to FIG. 8, in accordance with an embodiment, a communication system includes a telecommunication network 810, such as a 3GPP-type cellular network, which comprises access network 811, such as a radio access network, and core network 814. Access network 811 comprises a plurality of base stations 812a, 812b, 812c, such as NBs, eNBs, gNBs or other types of wireless access points, each defining a corresponding coverage area 813a, 813b, 813c. Each base station 812a, 812b, 812c is connectable to core network 814 over a wired or wireless connection 815. A first UE 891 located in coverage area 813c is configured to wirelessly connect to, or be paged by, the corresponding base station 812c. A second UE 892 in coverage area 813a is wirelessly connectable to the corresponding base station 812a. While a plurality of UEs 891, 892 are illustrated in this example, the disclosed embodiments are equally applicable to a situation where a sole UE is in the coverage area or where a sole UE is connecting to the corresponding base station 812.

Telecommunication network 810 is itself connected to host computer 830, which may be embodied in the hardware and/or software of a standalone server, a cloud-implemented server, a distributed server or as processing resources in a server farm. Host computer 830 may be under the ownership or control of a service provider, or may be operated by the service provider or on behalf of the service provider. Connections 821 and 822 between telecommunication network 810 and host computer 830 may extend directly from core network 814 to host computer 830 or may go via an optional intermediate network 820. Intermediate network 820 may be one of, or a combination of more than one of, a public, private or hosted network; intermediate network 820, if any, may be a backbone network or the Internet; in particular, intermediate network 820 may comprise two or more sub-networks (not shown).

The communication system of FIG. 8 as a whole enables connectivity between the connected UEs 891, 892 and host computer 830. The connectivity may be described as an over-the-top (OTT) connection 850. Host computer 830 and the connected UEs 891, 892 are configured to communicate data and/or signaling via OTT connection 850, using access network 811, core network 814, any intermediate network 820 and possible further infrastructure (not shown) as intermediaries. OTT connection 850 may be transparent in the sense that the participating communication devices through which OTT connection 850 passes are unaware of routing of uplink and downlink communications. For example, base station 812 may not or need not be informed about the past routing of an incoming downlink communication with data originating from host computer 830 to be forwarded (e.g., handed over) to a connected UE 891. Similarly, base station 812 need not be aware of the future routing of an outgoing uplink communication originating from the UE 891 towards the host computer 830.

Example implementations, in accordance with an embodiment, of the UE, base station and host computer discussed in the preceding paragraphs will now be described with reference to FIG. 9. In communication system 900, host computer 910 comprises hardware 915 including communication interface 916 configured to set up and maintain a wired or wireless connection with an interface of a different communication device of communication system 900. Host computer 910 further comprises processing circuitry 918, which may have storage and/or processing capabilities. In particular, processing circuitry 918 may comprise one or more programmable processors, application-specific integrated circuits, field programmable gate arrays or combinations of these (not shown) adapted to execute instructions. Host computer 910 further comprises software 911, which is stored in or accessible by host computer 910 and executable by processing circuitry 918. Software 911 includes host application 912. Host application 912 may be operable to provide a service to a remote user, such as UE 930 connecting via OTT connection 950 terminating at UE 930 and host computer 910. In providing the service to the remote user, host application 912 may provide user data which is transmitted using OTT connection 950.

Communication system 900 further includes base station 920 provided in a telecommunication system and comprising hardware 925 enabling it to communicate with host computer 910 and with UE 930. Hardware 925 may include communication interface 926 for setting up and maintaining a wired or wireless connection with an interface of a different communication device of communication system 900, as well as radio interface 927 for setting up and maintaining at least wireless connection 970 with UE 930 located in a coverage area (not shown in FIG. 9) served by base station 920. Communication interface 926 may be configured to facilitate connection 960 to host computer 910. Connection 960 may be direct or it may pass through a core network (not shown in FIG. 9) of the telecommunication system and/or through one or more intermediate networks outside the telecommunication system. In the embodiment shown, hardware 925 of base station 920 further includes processing circuitry 928, which may comprise one or more programmable processors, application-specific integrated circuits, field programmable gate arrays or combinations of these (not shown) adapted to execute instructions. Base station 920 further has software 921 stored internally or accessible via an external connection.

Communication system 900 further includes UE 930 already referred to. Its hardware 935 may include radio interface 937 configured to set up and maintain wireless connection 970 with a base station serving a coverage area in which UE 930 is currently located. Hardware 935 of UE 930 further includes processing circuitry 938, which may comprise one or more programmable processors, application-specific integrated circuits, field programmable gate arrays or combinations of these (not shown) adapted to execute instructions. UE 930 further comprises software 931, which is stored in or accessible by UE 930 and executable by processing circuitry 938. Software 931 includes client application 932. Client application 932 may be operable to provide a service to a human or non-human user via UE 930, with the support of host computer 910. In host computer 910, an executing host application 912 may communicate with the executing client application 932 via OTT connection 950 terminating at UE 930 and host computer 910. In providing the service to the user, client application 932 may receive request data from host application 912 and provide user data in response to the request data. OTT connection 950 may transfer both the request data and the user data. Client application 932 may interact with the user to generate the user data that it provides.

Figure 9:
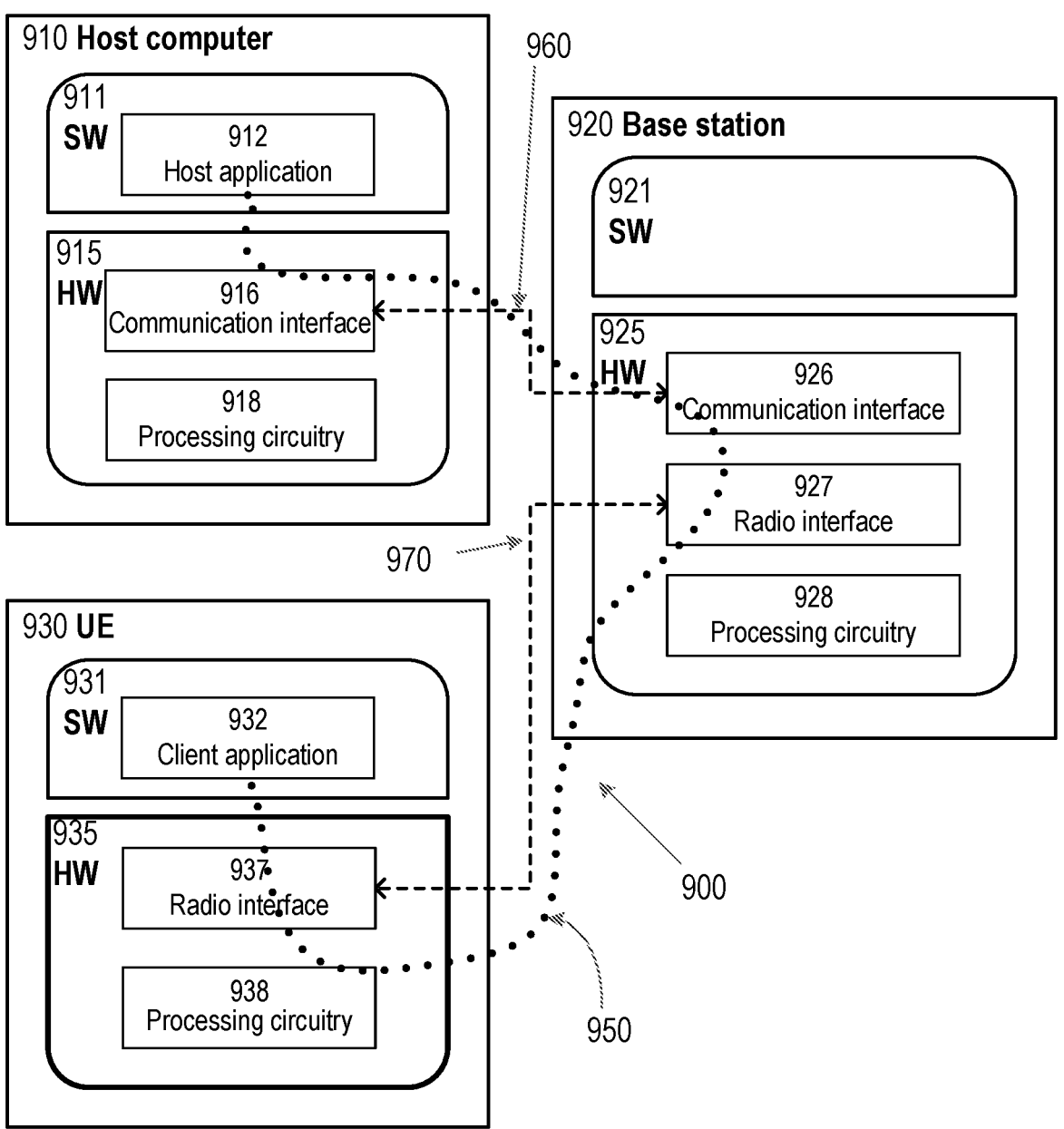
FIG. 9 depicts a host computer communicating via a base station with a user equipment over a partially wireless connection in accordance with some embodiments.

It is noted that host computer 910, base station 920 and UE 930 illustrated in FIG. 9 may be similar or identical to host computer 830, one of base stations 812*a*, 812*b*, 812*c* and one of UEs 891, 892 of FIG. 8, respectively. This is to say, the inner workings of these entities may be as shown in FIG. 9 and independently, the surrounding network topology may be that of FIG. 8.

In FIG. 9, OTT connection 950 has been drawn abstractly to illustrate the communication between host computer 910 and UE 930 via base station 920, without explicit reference to any intermediary devices and the precise routing of messages via these devices. Network infrastructure may determine the routing, which it may be configured to hide from UE 930 or from the service provider operating host computer 910, or both. While OTT connection 950 is active, the network infrastructure may further take decisions by which it dynamically changes the routing (e.g., on the basis of load balancing consideration or reconfiguration of the network).

Wireless connection 970 between UE 930 and base station 920 is in accordance with the teachings of the embodiments described throughout this disclosure. One or more of the various embodiments improve the performance of OTT services provided to UE 930 using OTT connection 950, in which wireless connection 970 forms the last segment. More precisely, the teachings of these embodiments may improve and enable efficient use of network resources (e.g., bandwidth, management resources, data rate, latency, memory usage, power consumption, etc. and thereby provide benefits such as reduced user waiting time, relaxed restriction on file size, better responsiveness, extended battery lifetime, etc.

A measurement procedure may be provided for the purpose of monitoring data rate, latency and other factors on which the one or more embodiments improve. There may further be an optional network functionality for reconfiguring OTT connection 950 between host computer 910 and UE 930, in response to variations in the measurement results. The measurement procedure and/or the network functionality for reconfiguring OTT connection 950 may be implemented in software 911 and hardware 915 of host computer 910 or in software 931 and hardware 935 of UE 930, or both. In embodiments, sensors (not shown) may be deployed in or in association with communication devices through which OTT connection 950 passes; the sensors may participate in the measurement procedure by supplying values of the monitored quantities exemplified above, or supplying values of other physical quantities from which software 911, 931 may compute or estimate the monitored quantities. The reconfiguring of OTT connection 950 may include message format, retransmission settings, preferred routing etc.; the reconfiguring need not affect base station 920, and it may be unknown or imperceptible to base station 920. Such procedures and functionalities may be known and practiced in the art. In certain embodiments, measurements may involve proprietary UE signaling facilitating host computer 910's measurements of throughput, propagation times, latency and the like. The measurements may be implemented in that software 911 and 931 causes messages to be transmitted, in particular empty or 'dummy' messages, using OTT connection 950 while it monitors propagation times, errors etc.

Figure 10:
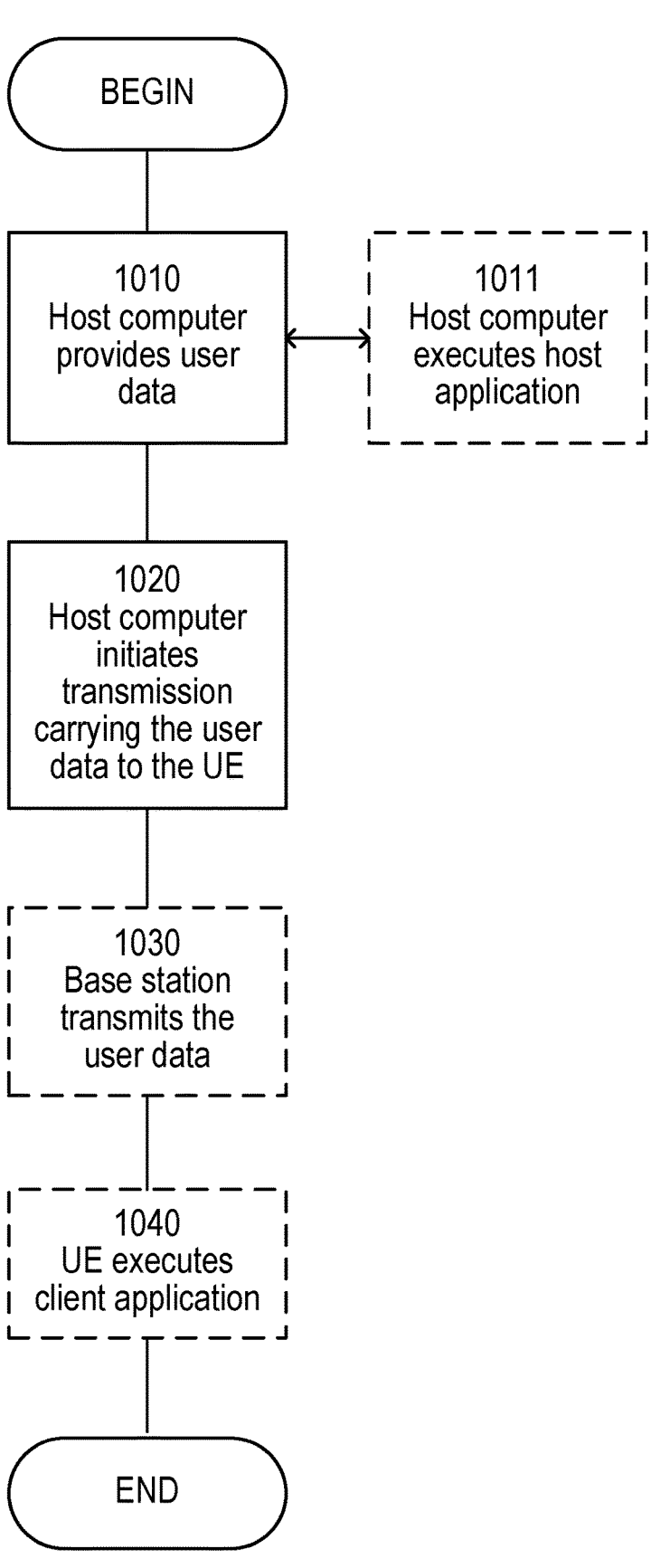
FIG. 10 depicts a flowchart of a method implemented in a communication system including a host computer, a base station and a user equipment in accordance with some embodiments.

FIG. 10 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 10 will be included in this section. In step 1010, the host computer provides user data. In substep 1011 (which may be optional) of step 1010, the host computer provides the user data by executing a host application. In step 1020, the host computer initiates a transmission carrying the user data to the UE. In step 1030 (which may be optional), the base station transmits to the UE the user data which was carried in the transmission that the host computer initiated, in accordance with the teachings of the embodiments described throughout this disclosure. In step 1040 (which may also be optional), the UE executes a client application associated with the host application executed by the host computer.

Figure 11:
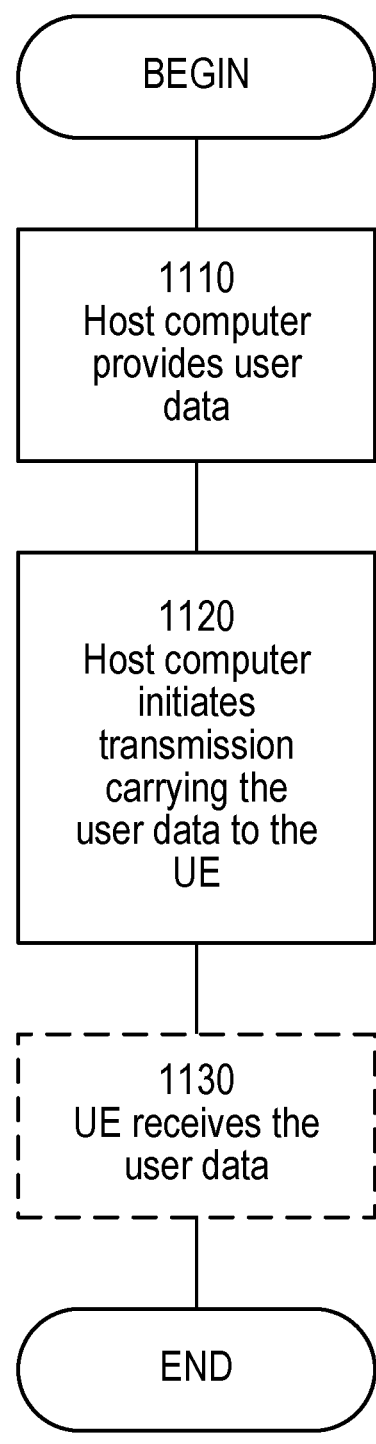
FIG. 11 depicts a flowchart of a method implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 11 will be included in this section. In step 1110 of the method, the host computer provides user data. In an optional substep (not shown) the host computer provides the user data by executing a host application. In step 1120, the host computer initiates a transmission carrying the user data to the UE. The transmission may pass via the base station, in accordance with the teachings of the embodiments described throughout this disclosure. In step 1130 (which may be optional), the UE receives the user data carried in the transmission.

Figure 12:
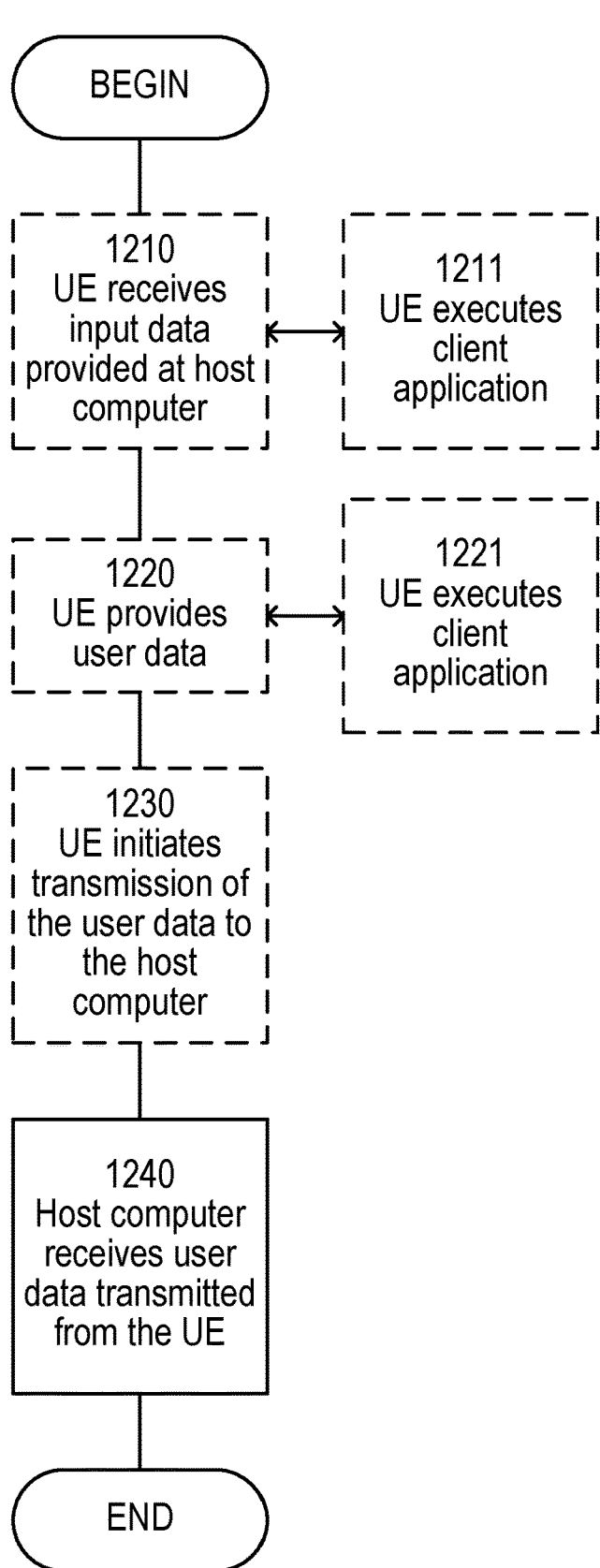
FIG. 12 depicts a flowchart of a method implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 12 will be included in this section. In step 1210 (which may be optional), the UE receives input data provided by the host computer. Additionally, or alternatively, in step 1220, the UE provides user data. In substep 1221 (which may be optional) of step 1220, the UE provides the user data by executing a client application. In substep 1211 (which may be optional) of step 1210, the UE executes a client application which provides the user data in reaction to the received input data provided by the host computer. In providing the user data, the executed client application may further consider user input received from the user. Regardless of the specific manner in which the user data was provided, the UE initiates, in substep 1230 (which may be optional), transmission of the user data to the host computer. In step 1240 of the method, the host computer receives the user data transmitted from the UE, in accordance with the teachings of the embodiments described throughout this disclosure.

Figure 13:
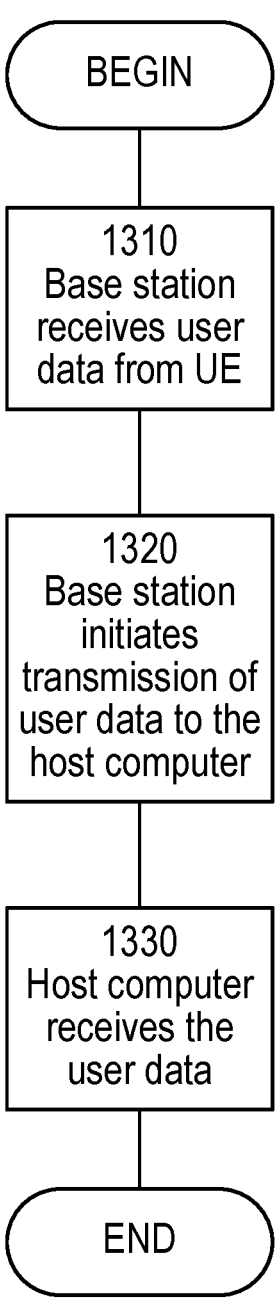
FIG. 13 depicts a flowchart of a method implemented in a communication system including a host computer, a base station and a user equipment in accordance with some embodiments.

FIG. 13 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 13 will be included in this section. In step 1310 (which may be optional), in accordance with the teachings of the embodiments described throughout this disclosure, the base station receives user data from the UE. In step 1320 (which may be optional), the base station initiates transmission of the received user data to the host computer. In step 1330 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Embodiments of the disclosure include the following statements:

1. A method performed by a wireless device for validating a timing advance, the method comprising:
   performing a first measurement of a time of arrival for a first beam, the first measurement being within a first duration of time;
   performing a second measurement of a time of arrival for a second beam, the second measurement being within a second duration of time;
   calculating a time difference of arrival (TDOA) magnitude of difference between the first measurement of the time of arrival for the first beam and the second measurement of the time of arrival for the second beam;
   comparing the TDOA magnitude of difference with a time-difference threshold; and determining whether the timing advance is valid based on a result of the comparing the TDOA magnitude of difference with the time-difference threshold.

2. The method of statement 1, wherein the determining includes determining that the timing advance is valid when the TDOA magnitude of difference is less than or equal to the time-difference threshold.

3. The method of statement 1, wherein the determining includes determining that the timing advance is invalid when the TDOA magnitude of difference is greater than the time-difference threshold.

4. The method of statement 1, wherein the time-difference threshold is preconfigured or configurable by a base station associated with the wireless device or predefined in a specification.

5. The method of statement 1, wherein the time-difference threshold is pre-determined by the wireless device.

6. The method of statement 1, wherein the first beam and the second beam are the same.

7. The method of statement 1, wherein the first beam is different from the second beam.

8. A method performed by a wireless device for validating a timing advance, the method comprising:
   performing a first measurement of a time of arrival for a first beam, the first measurement being within a first duration of time;
   performing a second measurement of a time of arrival for a second beam, the second measurement being within a second duration of time;
   calculating a time difference of arrival (TDOA) magnitude of difference between the first measurement of the time of arrival for the first beam and the second measurement of the time of arrival for the second beam;
   performing a third measurement of a signal strength for the first beam, the third measurement being within a third duration of time;
   performing a fourth measurement of a signal strength for the second beam, the fourth measurement being within a fourth duration of time;
   calculating a signal strength (SS) magnitude of difference between the third measurement of the signal strength for the first beam and the fourth measurement of the signal strength for the second beam;
   comparing the TDOA magnitude of difference with a time-difference threshold and comparing the SS magnitude of difference with a SS-difference threshold; and
   determining whether the timing advance is valid based on results of the comparing the TDOA magnitude of difference with the time-difference threshold and comparing the SS magnitude of difference with the SS-difference threshold.

9. The method of statement 8, wherein the determining includes determining that the timing advance is valid when the TDOA magnitude of difference is less than or equal to the time-difference threshold and/or when the SS magnitude of difference is greater than the SS-difference threshold.

10. The method of statement 8, wherein the determining includes determining that the timing advance is invalid when the TDOA magnitude of difference is greater than the time-difference threshold and/or when the SS magnitude of difference is less than or equal to the SS-difference threshold.

11. The method of statement 8, wherein the time-difference threshold and/or the SS-difference threshold is preconfigured or configurable by a base station associated with the wireless device or predefined in a specification.

12. The method of statement 8, wherein the time-difference threshold is pre-determined by the wireless device.

13. The method of statement 8, wherein the first beam and the second beam are the same.

14. The method of statement 8, wherein the first beam is different from the second beam.

15. The method of any of the previous statements, further comprising: transmitting information as to whether the timing advance is valid to a higher layer associated with the wireless device or to a base station associated with the wireless device.

16. The method of any of the previous statements, further comprising:
   providing user data; and
   forwarding the user data to a host computer via the transmission to the base station.

17. A method performed by a base station for validating a timing advance, the method comprising:
   determining a time-difference threshold for a wireless device; and
   transmitting the time-difference threshold to the wireless device, wherein
   to determine whether the timing advance is valid, the time-difference threshold is compared with a time difference of arrival (TDOA) magnitude of difference between a first measurement of a time of arrival for a first beam and a second measurement of a time of arrival for a second beam.

18. A method performed by a base station for validating a timing advance, the method comprising:
   determining a time-difference threshold for a wireless device;
   determining a signal strength-difference (SS-difference) threshold for the wireless device;
   transmitting the time-difference threshold and the SS-difference threshold to the wireless device, wherein
   to determine whether the timing advance is valid, the time-difference threshold is compared with a time difference of arrival (TDOA) magnitude of difference between a first measurement of a time of arrival for a first beam and a second measurement of a time of arrival for a second beam, and the SS-difference threshold is compared with a signal strength (SS) magnitude of difference between a third measurement of a signal strength for the first beam and a fourth measurement of a signal strength for the second beam.

19. The method of any of the previous statements, further comprising:
   obtaining user data; and
   forwarding the user data to a host computer or a wireless device.

20. A wireless device for validating a timing advance, the wireless device comprising:
   processing circuitry configured to perform any of the steps of any of statements 1 to 16; and
   power supply circuitry configured to supply power to the wireless device.

21. A base station for validating a timing advance, the base station comprising:
   processing circuitry configured to perform any of the steps of any of statements 17 to 19;

power supply circuitry configured to supply power to the wireless device.

22. A user equipment (UE) for validating a timing advance, the UE comprising:
   an antenna configured to send and receive wireless signals;
   radio front-end circuitry connected to the antenna and to processing circuitry, and configured to condition signals communicated between the antenna and the processing circuitry;
   the processing circuitry being configured to perform any of the steps of any of statements 1 to 16;
   an input interface connected to the processing circuitry and configured to allow input of information into the UE to be processed by the processing circuitry;
   an output interface connected to the processing circuitry and configured to output information from the UE that has been processed by the processing circuitry; and
   a battery connected to the processing circuitry and configured to supply power to the UE.

23. A communication system including a host computer comprising:
   processing circuitry configured to provide user data; and
   a communication interface configured to forward the user data to a cellular network for transmission to a user equipment (UE),
   wherein the cellular network comprises a base station having a radio interface and processing circuitry, the base station's processing circuitry configured to perform any of the steps of any of statements 17 to 19.

24. The communication system of the previous statement further including the base station.

25. The communication system of the previous 2 statements, further including the UE, wherein the UE is configured to communicate with the base station.

26. The communication system of the previous 3 statements, wherein:
   the processing circuitry of the host computer is configured to execute a host application, thereby providing the user data; and
   the UE comprises processing circuitry configured to execute a client application associated with the host application.

27. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the base station performs any of the steps of any of statements 17 to 19.

28. The method of the previous statement, further comprising, at the base station, transmitting the user data.

29. The method of the previous 2 statements, wherein the user data is provided at the host computer by executing a host application, the method further comprising, at the UE, executing a client application associated with the host application.

30. A user equipment (UE) configured to communicate with a base station, the UE comprising a radio interface and processing circuitry configured to performs the of the previous 3 statements.

31. A communication system including a host computer comprising:

processing circuitry configured to provide user data; and a communication interface configured to forward user data to a cellular network for transmission to a user equipment (UE), wherein the UE comprises a radio interface and processing circuitry, the UE's components configured to perform any of the steps of any of statements 1 to 16.

32. The communication system of the previous statement, wherein the cellular network further includes a base station configured to communicate with the UE.

33. The communication system of the previous 2 statements, wherein:

the processing circuitry of the host computer is configured to execute a host application, thereby providing the user data; and the UE's processing circuitry is configured to execute a client application associated with the host application.

34. A method implemented in a communication system including a host computer, a base station and a user equipment (UE), the method comprising:

at the host computer, providing user data; and at the host computer, initiating a transmission carrying the user data to the UE via a cellular network comprising the base station, wherein the UE performs any of the steps of any of statements 1 to 16.

35. The method of the previous statement, further comprising at the UE, receiving the user data from the base station.

36. A communication system including a host computer comprising:

communication interface configured to receive user data originating from a transmission from a user equipment (UE) to a base station, wherein the UE comprises a radio interface and processing circuitry, the UE's processing circuitry configured to perform any of the steps of any of statements 1 to 16.

37. The communication system of the previous statement, further including the UE.

38. The communication system of the previous 2 statements, further including the base station, wherein the base station comprises a radio interface configured to communicate with the UE and a communication interface configured to forward to the host computer the user data carried by a transmission from the UE to the base station.

39. The communication system of the previous 3 statements, wherein:

the processing circuitry of the host computer is configured to execute a host application; and the UE's processing circuitry is configured to execute a client application associated with the host application, thereby providing the user data.

40. The communication system of the previous 4 statements, wherein:

the processing circuitry of the host computer is configured to execute a host application, thereby providing request data; and the UE's processing circuitry is configured to execute a client application associated with the host application, thereby providing the user data in response to the request data.

41. A method implemented in a communication system including a host computer, a base station and a user equipment (UE), the method comprising:

at the host computer, receiving user data transmitted to the base station from the UE, wherein the UE performs any of the steps of any of statements 1 to 16.

42. The method of the previous statement, further comprising, at the UE, providing the user data to the base station.

43. The method of the previous 2 statements, further comprising:

at the UE, executing a client application, thereby providing the user data to be transmitted; and at the host computer, executing a host application associated with the client application.

44. The method of the previous 3 statements, further comprising:

at the UE, executing a client application; and at the UE, receiving input data to the client application, the input data being provided at the host computer by executing a host application associated with the client application, wherein the user data to be transmitted is provided by the client application in response to the input data.

45. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of statements 17 to 19.

46. The communication system of the previous statement further including the base station.

47. The communication system of the previous 2 statements, further including the UE, wherein the UE is configured to communicate with the base station.

48. The communication system of the previous 3 statements, wherein:

the processing circuitry of the host computer is configured to execute a host application; and the UE is configured to execute a client application associated with the host application, thereby providing the user data to be received by the host computer.

49. A method implemented in a communication system including a host computer, a base station and a user equipment (UE), the method comprising:

at the host computer, receiving, from the base station, user data originating from a transmission which the base station has received from the UE, wherein the UE performs any of the steps of any of statements 1 to 16.

50. The method of the previous statement, further comprising at the base station, receiving the user data from the UE.

51. The method of the previous 2 statements, further comprising at the base station, initiating a transmission of the received user data to the host computer

What is claimed is:

1. A method performed by a wireless device for validating a timing advance, the method comprising:

performing a first measurement of a time of arrival for a first beam, the first measurement being within a first duration of time;

performing a second measurement of a time of arrival for a second beam, the second measurement being within a second duration of time;

calculating a time difference of arrival (TDOA) magnitude of difference between the first measurement of the time of arrival for the first beam and the second measurement of the time of arrival for the second beam;

comparing the TDOA magnitude of difference with a time-difference threshold;

performing a third measurement of a signal strength for the first beam, the third measurement being within a third duration of time;

performing a fourth measurement of a signal strength for the second beam, the fourth measurement being within a fourth duration of time;

calculating a magnitude of a signal strength (SS) difference between the third measurement of the signal strength for the first beam and the fourth measurement of the signal strength for the second beam;

comparing the TDOA magnitude of difference with a time-difference threshold and comparing the SS magnitude of difference with a SS-difference threshold; and determining whether the timing advance is valid based on results of the comparing the TDOA magnitude of difference with the time-difference threshold and comparing the SS magnitude of difference with the SS-difference threshold.

2. The method of claim 1, wherein the determining includes determining that the timing advance is valid when the TDOA magnitude of difference is less than or equal to the time-difference threshold.

3. The method of claim 1, wherein the determining includes determining that the timing advance is invalid when the TDOA magnitude of difference is greater than the time-difference threshold.

4. The method of claim 1, wherein the time-difference threshold is preconfigured or configurable by a network node associated with the wireless device or predefined.

5. The method of claim 1, wherein the time-difference threshold is pre-determined by the wireless device.

6. The method of claim 1, wherein the first beam and the second beam are the same.

7. The method of claim 1, wherein the first beam is different from the second beam.

8. The method of claim 1, wherein the determining includes determining that the timing advance is valid when the TDOA magnitude of difference is less than or equal to the time-difference threshold and/or when the SS magnitude of difference is greater than the SS-difference threshold.

9. The method of claim 1, wherein the determining includes determining that the timing advance is invalid when the TDOA magnitude of difference is greater than the time-difference threshold and/or when the SS magnitude of difference is less than or equal to the SS-difference threshold.

10. The method of claim 1, wherein the time-difference threshold and/or the SS-difference threshold is preconfigured or configurable by a network node associated with the wireless device or predefined.

11. The method of claim 1, wherein the time-difference threshold is pre-determined by the wireless device.

12. The method of claim 1, wherein the first beam and the second beam are the same.

13. The method of claim 1, wherein the first beam is different from the second beam.

14. The method of claim 1, further comprising:

transmitting information as to whether the timing advance is valid to a higher layer associated with the wireless device or to a network node associated with the wireless device.

15. The method of claim 1, further comprising:

determining whether the timing advance is valid based on:

the results of the comparing the TDOA magnitude of difference with the time-difference threshold and either a message received from a network node or a predetermined rule; and/or the results of the comparing the SS magnitude of difference with the SS-difference threshold and either a message received from the network node or a predetermined rule.

16. The method of claim 1, further comprising:

determining whether the timing advance is valid based on the results of comparing the SS magnitude of difference with the SS-difference threshold upon determining that:

the first beam and the second beam are different, or upon determining that the first beam has changed by a number of times more than a threshold between the first duration of time and the second duration of time.

17. A method performed by a network node for validating a timing advance, the method comprising:

determining a time-difference threshold for a wireless device; and determining a signal strength-difference (SS-difference) threshold for the wireless device; and transmitting the time-difference threshold and the SS-difference threshold to the wireless device, wherein to determine whether the timing advance is valid, the time-difference threshold is compared with a time difference of arrival (TDOA) magnitude of difference between a first measurement of a time of arrival for a first beam and a second measurement of a time of arrival for a second beam, and the SS-difference threshold is compared with a signal strength (SS) magnitude of difference between a third measurement of a signal strength for the first beam and a fourth measurement of a signal strength for the second beam.

18. The method of claim 16, further comprising:

obtaining user data; and forwarding the user data to a host computer or a wireless device.

19. A wireless device for validating a timing advance, the wireless device comprising:

processing circuitry configured to:

perform a first measurement of a time of arrival for a first beam, the first measurement being within a first duration of time, perform a second measurement of a time of arrival for a second beam, the second measurement being within a second duration of time, calculate a time difference of arrival (TDOA) magnitude of difference between the first measurement of the time of arrival for the first beam and the second measurement of the time of arrival for the second beam, compare the TDOA magnitude of difference with a time-difference threshold, perform a third measurement of a signal strength for the first beam, the third measurement being within a third duration of time;

perform a fourth measurement of a signal strength for the second beam, the fourth measurement being within a fourth duration of time;

calculate a magnitude of a signal strength (SS) difference between the third measurement of the signal strength for the first beam and the fourth measurement of the signal strength for the second beam;

compare the TDOA magnitude of difference with a time-difference threshold and comparing the SS magnitude of difference with a SS-difference threshold; and determine whether the timing advance is valid based on results of the comparing the TDOA magnitude of difference with the time-difference threshold and comparing the SS magnitude of difference with the SS-difference threshold; and power supply circuitry configured to supply power to the wireless device.

20. A network node for validating a timing advance, the network node comprising:

processing circuitry configured to:

determine a time-difference threshold for a wireless device;

determine a signal strength-difference (SS-difference) threshold for the wireless device; and transmit the time-difference threshold and the SS-difference threshold to the wireless device, wherein to determine whether the timing advance is valid, the time-difference threshold is compared with a time difference of arrival (TDOA) magnitude of difference between a first measurement of a time of arrival for a first beam and a second measurement of a time of arrival for a second beam, and the SS-difference threshold is compared with a signal strength (SS) magnitude of difference between a third measurement of a signal strength for the first beam and a fourth measurement of a signal strength for the second beam; and power supply circuitry configured to supply power to the wireless device.

* * * * *